US006129945A

United States Patent [19]
Awad et al.

[11] Patent Number: 6,129,945
[45] Date of Patent: Oct. 10, 2000

[54] METHODS TO REDUCE FREE FATTY ACIDS AND CHOLESTEROL IN ANHYDROUS ANIMAL FAT

[75] Inventors: Aziz Chafic Awad, East Lansing; James Ian Gray, Haslett, both of Mich.

[73] Assignee: Michael E. George, Farmington Hills, Mich.

[21] Appl. No.: 09/208,960

[22] Filed: Dec. 10, 1998

[51] Int. Cl.$^7$ ...................................... A23C 7/04
[52] U.S. Cl. .......................... 426/580; 426/417; 426/581; 426/585; 426/586; 426/664
[58] Field of Search .................................. 426/580, 581, 426/585, 664, 417, 614, 586, 663

[56] References Cited

U.S. PATENT DOCUMENTS

| | | |
|---|---|---|
| 3,560,219 | 2/1971 | Attebery . |
| 4,880,573 | 11/1989 | Courregelonque et al. . |
| 4,980,180 | 12/1990 | Cully et al. . |
| 5,223,295 | 6/1993 | Maffrand et al. . |
| 5,232,725 | 8/1993 | Roderbourg et al. . |
| 5,264,241 | 11/1993 | Graille et al. . |
| 5,382,442 | 1/1995 | Perlman et al. . |
| 5,484,624 | 1/1996 | Awad et al. . |
| 5,738,898 | 4/1998 | Smith et al. ............................. 426/614 |
| 5,824,354 | 10/1998 | Ritter et al. ............................. 426/417 |

FOREIGN PATENT DOCUMENTS

| | | |
|---|---|---|
| 0 326 469 | 4/1989 | European Pat. Off. . |
| WO91/11114 | 3/1991 | WIPO . |

OTHER PUBLICATIONS

Advanced Dairy Chemistry, vol. 2, 108–115, Ed. P. F. Fox, 1994.
Advanced Dairy Chemistry, vol. 2, 160–163, Ed. P. F. Fox, 1994.
Fundamentals of Dairy Chemistry, 3rd Edition 144–149, 1988, Ed. Wong et al.
Fundamentals of Dairy Chemistry, Third Edition p. 215, 1988, Ed. Wong et al.
Grundy, S.M., Am. J. Clin. Nutr. 45:1168 (1987).
Dyerberg, J., Nutrition Review 44 (4):125 (1986).
Khosla, P., and K. C., Hayes, Biochim Biophys Acta 1210:13 (1993).
Sundram, K., et al., Am. J. Clin. Nutr. 59:841 (1994).
Kennedy, J., Food Technol. 11:76 (1991).
Gurr, M. I., Advanced Dairy chemistry, Lipids, P.F. Fox (ed.), p. 349. Chapman & Hall, London (1994).
Walstra, P., et al., Advanced Dairy Chemistry, Lipids, P.F. Fox (ed) Chapter 5, pp. 179–212 Chapman & Hall London (1994).
Christophe, A. M., et al., Arch. Int. Physiol. Biochem 86:413 (1978).
Christophe, A. M., et al., Arch. Int. Physiol Biochim. 89:B156 (1981).
Frede, Bulletin of the International Dairy Federation No. 260 (1991).
Sreenivasan, B., J. Am. Oil Soc. 55:796 (1950).
Braae, B., J. Am. Oil Chem. Soc. 53:353 (1976).
Carr, R. A., J. Am. Oil Chem Soc. 53:347 (1976).
MacDonald, I. A., et al. J. Lipid Res. 24:675 (1983).
Smith, M., et al Journal of Agricultural and Food Chemistry, 39:2158 (1991).
Arul, J., et al Am. Oil Chem. Soc., 65:1642 (1988).
Friedrich, J. P., and E. H. Pryde, J. Am. Oil Chem. Soc. 61:223 (1984).
Arul, J., et al. J. Food Sci. 52:1231–1236 (1987).
Szejtli, J., et al., Inclusion Compound 3:331 (1984).
Yen, C. G., and L. J. Tsai, J. Food Sci 60:561 (1995).
AOAC Official Methods of Analysis 16th Ed. Association of Official Analytical Chemists, Washington, DC (1995).
Small, D.M., Molecular Biology and biotechnology, R.A. Meyers (ed), 503–511. VCH Publishers, Inc. USA (1995).
Hayes, K.C., Food Technology Journal 50(4) :92–97 (1996).
Yeong, et al, J. Agric. Food Chem 37:75–81 (1989).
Lim, S. and S.S.H. Rizvi J. Food Science 61(4) :817–821 (1996).
Design and Analysis of Experiments in the Animal and Medical Science. vol. 2, Chapter 9, Michigan State University, (1993).
Code of Federal Regulations, Title 7 Agriculture, Sec. 58.305 (c), and International Dairy Federation 68 A 1977.
Code of Federal REgulations, Title 7 sec. 58.347 (a).
Code of Federal Regulations, Title 9 Sec. 319.709 (c) Animal and Animal Products.
USDA Nutrient Database for Standard Reference (1997).
Code of Federal Regulations, Title 40 Protection of Environment, Sec. 432,101 (d).
Code of Federal Regulations, Title 21 Food and Drugs, Sec. 184.1979 (a).
USDA Nutrient Database for Standard Reference (1999).
Food Chemistry, pp. 301, 303, second edition, edited by Owen R. Fennema, Dept. of Food Science, Univ. of Wisconsin–Madison, Madison, Wisconsin; Marcel Dekker, Inc., New York).

*Primary Examiner*—Leslie Wong
*Attorney, Agent, or Firm*—Ian C. McLeod

[57] ABSTRACT

A process for removing free fatty acids (FFA) and preferably cholesterol from liquid anhydrous animal fats is described. The process uses a dilute solution of alkali metal base to form a salt of the FFA and then an alkali metal salt to precipitate the FFA from the animal fat. Preferably, a cyclodextrin is used in the process to remove cholesterol. Liquid vegetable fats are used in blends with the processed animal fat to produce a spreadable mixture for table use. The processed animal fat can be reconstituted to whole milk with the FFA and cholesterol removed for various commercial uses.

20 Claims, 16 Drawing Sheets

10(g) of anhydrous milkfat (AMF)

10 mL refining solution[a]

Heat to 50°C in a hot water bath while mixing at 1800 rpm
(using 50 mL beaker, Lightnin Lab Master (SI) Mixer model L1U03 and an impeller type A100 (dia 1"))

When the temperature reaches 50°C set the mixer timer at 1 to 10 min using the same mixing rate 1800rpm

Centrifuge at 1085 to 8700×g, 10min, room temperature

 

Heavy phase          Light phase
($H_2O$ and Ca and K salts)     (91.58 % FFAs free AMF)

FIGURE 1

10 (g) anhydrous milkfat (AMF)
13 (g) liquid formula[a]
Heat to 50°C in a hot water bath while mixing at 1400 rpm
(using 50 mL beaker, Lightnin Lab Master (SI) Mixer model L1U03 and an
Impeller type A100 (dia 1"))
At 50°C add 650 mg β–Cyclodextrin (powder)
Mix at 1400 rpm, 30 min at 50°C
Centrifuge at 8700 × g, 10min, room temperature
The fat is recovered in the supernatant light phase
(95.22 % cholesterol free and 92.40 % FFAs free)
FIGURE 16

METHODS TO REDUCE FREE FATTY ACIDS AND CHOLESTEROL IN ANHYDROUS ANIMAL FAT

BACKGROUND OF THE INVENTION (1) Field of the Invention

The invention relates to a process for the reduction of free fatty acids (FFA) and preferably, cholesterol and melting point in animal fats, particularly anhydrous milkfat. The process uses β-cyclodextrin and an aqueous liquid formula consisting of alkali metal hydroxide (Na or K) as a neutralizing agent, alkaline earth metal (Ca or Mg salts) as fatty acid acceptors, and preferably low melting point vegetable oils. In particular, the present invention relates to a process wherein a mixture of animal fats with the liquid formula with mild heating is used to precipitate the FFA, to decrease the melting point, and to clathrate the cholesterol with the β-cyclodextrin and then the mixture is centrifuged to remove the insoluble salts of fatty acids and clathrate. The invention particularly addresses the problem of selectively removing the FFA from anhydrous milkfat without precipitating the lipid materials (the anhydrous milkfat) or damaging the fine volatile flavor components of anhydrous milkfat, which are the lactones.

(2) Description of the Prior Art

It has long been known, that very high serum cholesterol levels, high blood pressure, and an abnormal electrocardiogram (EKG) are important contributing factors to heart attacks. It is important to note that these factors become apparent long before the effects of smoking, obesity, lack of exercise are observed. The importance of serum cholesterol levels has been strengthened over the years, and one of the most consistent findings in cardiovascular studies is that high levels of plasma cholesterol are associated with atherosclerosis and enhanced risk of coronary heart disease (CHD). This effect usually is mediated through the plasma low density lipoproteins (LDL), which are the most atherogenic lipoproteins (Grundy, S. M., Am. J. Clin. Nutr. 45:1168 (1987)).

The major causes of high serum cholesterol levels are genetic disorders, heterozygous familial hypercholesterolemia (FH), and the habitual diet high in saturated fat-calories-cholesterol.

Health experts and physicians generally agree that the dietary management is the initial step in the treatment of hypercholesterolemia and hyperlipidemia. This applies even when later drug therapy is required. Changes in diet, serum cholesterol and CHD in immigrant populations have provided convincing evidence that diet plays a major role (Dyerberg, J., Nutrition Review 44(4):125 (1986)).

Although the consumption of cholesterol does not seem to be a major factor in CHD, Khosla, P., and K. C. Hayes, Biochim Biophys Acta 1210:13 (1993) reported that excessive intake of dietary cholesterol exerts a synergistic effect on the metabolism of $C_{16:0}$-rich fats, causing them to be hypercholesterolemic. In the absence of dietary cholesterol and in individuals with normal lipoprotein profiles, $C_{16:0}$ does not ordinarily raise total plasma cholesterol concentration or LDL (Hayes, K. C., Food Technology Journal 50(4):92–97 (1996). Further, it has been reported that oxides of cholesterol are toxic and cause degeneration of aortic smooth muscle cells in tissue culture and may lead to the development of atherosclerosis.

Milkfat is stable to oxidation and possesses a uniquely pleasing flavor not found in other fats. Milkfat has received most attention because of its commercial importance. It confers distinctive properties on dairy products that affect processing. Milkfat is a good source of essential fatty acids and it contains a high proportion of short chain fatty acids which contributes to its ease of digestibility (Kennedy, J., Food Technol. 11:76 (1991)). Moreover, milkfat contains conjugated linoleic acids (CLA) recognized for their potential ability to inhibit cancer (Yeong et al., J. Agric. Food Chem, 37:75–81 (1989)). CLA are unusual because they are abundant in products from ruminant animals. They are formed during the process of biohydrogenation of polyunsaturated fatty acids (PUFA) in the rumen of cows and subsequently find their way into milk (Gurr, M. I., Advanced Dairy Chemistry, Lipids, P. F. Fox (ed.), p. 349. Chapman & Hall, London (1994)). One epidemiological study compared dietary habits in rural Finland which has one-quarter the incidence of colon cancer compared with urban Copenhagen, Denmark (MacLennan, R., et al., Am. J. Clin. Nutr. 31:S239 (1978). The community with a low incidence of colon cancer consumed more potatoes and whole milk than the high incidence group and ate less white bread and meat. Milkfat has a high proportion of saturated fatty acids, mainly $C_{16:0}$ (26.3%), and cholesterol (0.2–0.4%) which has resulted in its decreasing consumption. This is because of the perception that the milkfat is bad for the diet.

Among most of the natural fats, milkfat is the most varied in its chemical characteristics and functional property. The melting point of milkfat increases with increasing saturation and chain length of its fatty acids components (Walstra, P., et al., Advanced Dairy Chemistry, Lipids (P. F. Fox (ed) Chapter 5, pp. 179–212 Chapman & Hall, London (1994)). The melting point of milkfat is also affected by the positioning of the fatty acid residues over the glycerol molecule (Walstra et al., IBID). In its native form, milkfat does not always suit various food formulations. For example, the wide melting range of milkfat, −40 to 40° C. (Walstra et al., IBID), makes it difficult to produce spreadable butter at refrigeration temperature which is considered by many modern consumers to be an undesirable attribute. Therefore, new fields of use of milkfat are constrained due to its limited functionality (pourability and spreadability).

An optimum fat cannot always be obtained from nature. Animal fats, when viewed in their native state, have limited use. But they can become an economic asset when viewed as a raw material to produce fats with desirable health characteristics.

The fats and oils industry is looking at new techniques to alter the fat molecules. The biggest challenge is to reconcile the functional needs with the nutritional concerns. In terms of physical and nutritional performance, interesterificaton of milkfat or milkfat/vegetable oils is a useful technique to achieve a desired softening point. Interesterification of milkfat alters the distribution of fatty acids in the triacylglycerol and thus, changes its physical properties such as melting behavior, crystallization, and plasticity. Christophe, A. M., et al., Arch. Int. Physiol. Biochem 86:413 (1978) have shown that interesterification of milkfat with chemical catalysts reduces its potency to raise the blood serum cholesterol in human. Interesterified milkfat appears to be more rapidly hydrolyzed by pancreatic lipases in vitro than native milkfat (Christophe, A. M., et al., Arch Int. Physiol. Biochim. 89:B156 (1981)).

Interesterification can be accomplished by heating the fat or a blend of fat and oil in the presence of a chemical catalyst at relatively low temperature (50° C.) for 30 minutes (Eckey,, E. W. Ind. and Eng. Chem. 40:1183 (1948)). Catalysts are commonly used to allow the reaction to be completed in a short time at lower temperatures. Alkali metals and alkali metal alkylates are effective low-temperature catalysts, with sodium methoxide being the most used. Directed interesterification, where the fat is heated just below its melting point, is a useful technique to remove the saturated fatty acids from the fat as crystallized trisaturated glycerides precipitates (Eckey, E. W., Ind. and Eng. Chem. 40:1183 (1948)) and therefore, improving its nutritional properties (saturated:unsaturated fatty acids ratio). Eckey was able to remove 19% trisaturated glycerides from cottonseed oil, which contains 25% saturated fatty acids. Directed interesterification had been commonly used in the industry to improve the quality of lard (Hawley, H. K., and G. W. Holman, J. Am. Oil Chem. Soc. 33:29 (1956)).

Nevertheless, interesterification has not yet been applied to the milkfat industry, since its feasibility is restricted by the fact that it is often deleterious to milkfat flavor, refining and deodorization to remove milkfat FFA (Frede, 1991; Bulletin of the International Dairy Federation No 260/1991). FFAs consume the catalyst or inactivate the active catalyst once it is formed. Sreenivasan, B., J. Am. Oil Soc. 55:796 (1978) reported that an acid value (A.V.) of 0.1 is able to poison 0.1 lb of sodium methoxide per 1000 lbs of oil. Thus, removing the FFA from anhydrous milkfat is an important step, before interesterification. Moreover, FFAs are more prone to oxidation than esterified fatty acids and hence can predispose milkfat to oxidative rancidity characterized by off-flavor described as "bitter".

U.S. Pat. No. 5,382,442 to Perlman et al. (1995) describes a blending process to increase the oxidative stability of vegetable or fish oils and animal fats. The fat blends consist of vegetable or fish oil and cholesterol reduced animal fats which comprises about 2 parts and about 9 parts linoleic acid per 1 part myristic acid.

Refining and deodorization of fats and oils are very commonly used techniques in the fat and oil industry to remove FFA. Alkali refining, used by the vast majority of European and American refiners (Braae, B., J. Am. Oil Chem. Soc 53:353 (1976); Carr, R. A., J. Am. Oil Chem. Soc. 53:347 (1976)), consists of heating the fat or oil to 75–90° C. then treating it with a concentrated caustic solution of sodium hydroxides, 12 to 18° Be', depending on the type of oil (cotton, soybean, corn, palm, safflower, peanut) for 30 seconds (Short-Mix process) or 0.2 seconds with 28° Be' sodium hydroxide (Ultra-Short-Mix process). Using these processes for milkfat is very detrimental to the lactones, the major milkfat flavor components. Lactones (γ or δ) are cyclic esters of γ or δ—hydroxy acid which in the presence of concentrated caustic solution are rapidly hydrolyzed to give the open chain salt of hydroxy acids. Consequently, the prior-art processes, short reaction time, high concentration caustic solution, and high temperature cannot be applied to milkfat.

Deodorization, very commonly used in the fats and oils industry, consists of blowing steam through hot oil at 200° to 275° C. under a high vacuum (3–10 torr). The deodorization process removes simultaneously the FFAs, fat soluble vitamins (A, E, D, K), monoglycerides, sterols, and some pigments such as caratenoids. As the term implies, deodorization strips off the aroma and flavors of fats and oils resulting in a bland finished product which is viewed as extremely undesirable for milkfat. Therefore, refining by using concentrated alkali metal hydroxide and deodorization of milkfat reduces the FFA losing the volatile fine milkfat flavor, the aroma, and the vitamins content. This puts milkfat in the same class as other cheap raw materials.

U.S. Pat. No. 3,560,219 to Attebery describes the use of metal salts under alkaline conditions to precipitate dissolved lipids in an aqueous food product such as cheese whey. This process however, is not selective for free fatty acids since all the lipid materials in the food products were precipitated. Therefore, this process cannot be used for food products consisting of pure lipid such as anhydrous milkfat.

Thus, the prior art has recognized the need to remove the FFA from milkfat without precipitating the milkfat per se or damaging the fine volatile milkfat flavor components. The growing concern regarding the cholesterol content of the human diet has led the food processors to develop several techniques to reduce cholesterol from milkfat.

Reduction of Milkfat Cholesterol by Enzymes

Cholesterol reductase catalyzes the conversion of cholesterol in the presence of NADPH to coprostanol which passes through the body without being absorbed (MacDonald, I. A., et al., J. Lipid Res. 24:675 (1983); the success-to-date is limited. In milk treated with cholesterol oxidase, the cholesterol concentration was reduced by 78% within 3 hours at 37° C. (Smith, M., et al., Journal of Agricultural and Food Chemistry, 39:2158 (1991)). It has been reported that oxides of cholesterol are themselves toxic (Peng, S.-K, and R. J. Morin, Biological Effects of Cholesterol Oxides. CRC Press, Boca Raton, Ann Arbor, London 1991). These processes are not practical for anhydrous milkfat.

Short-Path Distillation (SPD)

SPD consists of evaporation of molecules into substantially gas-free space, e.g., vacuum. The control factor is the rate at which the molecules escape from the heated surface of the distilling liquid and are received by the cooled condenser surface. Stripping vitamins A and E, sterols and volatiles from natural oils and separation of mono- and diglycerides and fatty acids are uses related to food besides chemical and pharmaceutical areas. Arul et al., J. Am. Oil Chem Soc. 65:1642 (1988) fractionated milkfat by SPD into four fractions at temperatures of 245 and 265° C. and pressures of 220 and 100 mm Hg. Two fractions were liquid, one fraction was semi-solid, and one fraction was solid at room temperature. The solid fraction contains cholesterol at a concentration of 0.2 mg/g fat compared with 2.6 mg/g fat in native milkfat or to 16.6 mg/g fat in the liquid fraction. SPD of milkfat offers an opportunity to obtain fractions from milkfat with different chemical and physical properties. However, there are some major drawbacks of this technique: (1) the low yield fraction where the cholesterol reduction was observed is solid and therefore, has a limited functionality; (2) the use of high temperature can decompose or polymerize the triacylglycerol, particularly those with high unsaturation even when distilled under vacuum; and (3) high capital investment.

Supercritical Fluid Extraction (SFE)

In this process, a product is treated with gas (usually carbon dioxide) of high density, low viscosity, and reduced surface tension under high pressure and temperature. The technique has been applied for delipidation of protein and reduction of cholesterol from different foods, decaffeination of coffee and tea, and also removal of bitter aroma compounds from hops. The procedure has the advantage of the absence of potentially toxic solvents and no toxic by-products are formed (Friedrich, J. P. and E. H. Pryde, J. Am. Oil Chem. Soc. 61:223 (1984)). Arul et al., J. Food Sci. 52:1231–1236 (1987) fractionated milkfat into 8 different fractions at 10–35 MPa and 50 to 70° C. They found that the cholesterol tended to concentrate in the low and intermediate melting fractions. Lim, S. and Rizvi, S. S. H., J. Food Science 61(4):817–821 (1996) achieved an overall cholesterol reduction of 92.6% with a process yield of 88.5%. The extraction was done at 40° C. and 24.1–27.5 MPa. The indiscriminate solvency of supercritical carbon dioxide is a major drawback in cholesterol reduction, since some triacylglycerols were extracted along with cholesterol which can disrupt the normal aromatic balance of milkfat.

Vacuum Steam Distillation

Vacuum steam distillation for deacidification and deodorization of oils has been practiced in Europe for many years. The technique consists of blowing superheated steam through hot oil at 200°–275° C. under high vacuum. General Mills, Inc. (Minneapolis, U.S.A.) has disclosed a vacuum steam distillation process for simultaneous cholesterol reduction and deacidification of butter oil (Marschner and Fine, U.S. Pat. No. 4,804,555 1989). The cholesterol removal achieved by this technique was 90%, with a 95% yield. The major drawback of this technique is that the heated steam strips off the volatile flavor components of milkfat along with cholesterol and FFA. The loss of the fine butter flavor puts milkfat in the same class as other cheap fats.

Complex Formation

This technique is used to reduce the cholesterol in milk and dairy products by complexing the cholesterol and its esters with a complexing agent such as β-cyclodextrin (β-CD).

Cyclodextrins are cyclic oligosaccharides obtained by enzymatic degradation of starch. They consist of six, seven, or eight glucose monomers arranged in a donut shaped ring, which are denoted alpha, beta or gamma cyclodextrin, respectively. β-CD are not hygroscopic and contain 13.6% moisture at 30° C. and 86% relative humidity (RH) (Szejtli, J., et al, Inclusion Compound 3:331 (1984)). Cyclodextrins are water soluble due to the location of free hydroxyl groups on the external rim of the molecule (Szejtli, J., et al, Inclusion Compound 3:331 (1984)). Solubility is a function of temperature. The higher the temperature the higher the solubility. The solubility of β-CD increases from 0.8% at 0.5° C. to 39.7% at 90° C. The internal cavity which is hydrophobic allows the cyclodextrins to complex molecules such as aromatic alcohols, fatty acids and their esters and cholesterol. β-CD has been used to reduce cholesterol in milkfat for several reasons:

1—The relative size and geometry of the β-CD internal cavity allowed good complexing with free and esterified cholesterol;

2—The realization of industrial scale production of β-CD;

3—The intensive research on toxicity of β-CD during the past decade, has assured its safety as a food ingredient.

Currently, cyclodextrins are used: (1) to control volatility of agricultural compounds which control pathogens, insects, and weeds; (2) in pharmaceutical products (drugs, vitamins), fragrance, and skin care lotions to improve stability by means of encapsulation; and (3) to enhance color, odor, and flavor stability in beverages and processed foods (Szejtli, J., Inclusion Compound 3:311 (1984)).

The most important parameters that determine whether a given molecule can form complexes are its hydrophobicity, relative size and geometry in relation to the cyclodextrin cavity (Szejtli, J., Inclusion Compound 3:331 (1984)). When dissolved in water, the cyclodextrin molecules are able to accommodate smaller guest molecules, or functional groups of molecules less hydrophilic than water in their internal cavities (Szejtli, J., Inclusion Compound 3:331 (1984)). In aqueous solution, the slightly apolar cyclodextrin cavity is occupied by water molecules, an energetically unfavored process (polar-apolar interaction). These water molecules are therefore readily substituted by appropriate guest molecules "such as cholesterol or FFA and their esters" which are less polar than water (Szejtli, J., Inclusion Compound 3:331 (1984)).

Six-month oral chronic toxicity of β-CD (Szejtli, J., Inclusion Compound 3:331 (1984)) was studied in rats by feeding up to 1.6 g/body weight kg/day and up to 0.6 g/body weight kg/day in dogs. Weight gain, food consumption, and clinico-biochemical values were not affected. "β-CD showed no embryo-toxic effect. Orally administered β-CD can thus be considered a non-toxic substance (Szejtli, J., Inclusion Compound 3:331 (1984)).

U.S. Pat. No. 4,880,573 (1989) to Courregelongue et al. describes the use 10% β-CD to remove 41% of the sterols from anhydrous milkfat. EP-A1-0 326 469 (1989) (European Patent) to Bayol et al. indicated the removal of 80% $\Delta^4$-cholesten-3-one from anhydrous milkfat. U.S. Pat. No. 5,232,725 to Roderbourg et al.(1993) describes a process for the removal of 37% or more of the cholesterol content of animal fat along with free fatty acids in one single operation using β-CD as a complexing agent. U.S. Pat. No. 5,264,241 to Graille et al.(1993), using β-CD, reported the simultaneous removal of 50% cholesterol and 52% FFA from cream. U.S. Pat. No. 5,223,295 to Maffrand et al. describes a process for removing cholesterol from fats of animal origin by complexing the steroidal compounds by means of a cyclodextrin, in an aqueous medium, under agitation for a period of 5 hours. This process is not only relatively long but it permits a limited reduction of the cholesterol content in a single operation. U.S. Pat. No. 4,980,180 (1990) to Cully et al. describes a method for removal of β-CD from egg materials using β-amylases. The patent recognizes the problem of incomplete removal of the cyclodextrins. In Australia, Okenfull et al., (1991)(PCT W091/11114) invented a process called SIDOAK to reduce cholesterol in dairy products. The process consists of adding β-CD to milk and mixing below 10° C. The insoluble complexes of cholesterol and β-CD were removed by centrifugation. The maximum cholesterol reduction obtained was 80–90%. Yen, C. G., and L. J. Tsai, J. Food Sci. 60:561 (1995), using 10% β-CD, indicated the removal of 95% cholesterol simultaneously with 50% FFA from lard. U.S. Pat. No. 5,484,624 to Awad et al. (1996) used β-CD to reduce the cholesterol in egg yolk by 96%. The process consists of mixing a diluted egg yolk (9<pH<10.5) with β-CD at 50° C. for 10 minutes. The complexes β-CD-cholesterol were removed from the medium by centrifugation.

The overall conclusion from all the β-CD processes developed to reduce cholesterol and FFA in animal fat is that there is a need for improvement. The modification of anhydrous milkfat by interesterification to improve its nutritional and functional properties remains constrained due to the high FFA content which poisons the catalysts.

Thus, the prior art has recognized that modifying milkfat by interesterification or blending and reducing its cholesterol content will not be competitive in the manufacture of fat products, at least as long as no process has been developed to simultaneously reduce cholesterol and FFA without damaging the volatile fine flavor components of milkfat, particularly the lactones. The wide melting range of milkfat, −40 to 40° C. (Walstra et al., IBID), makes it difficult to produce spreadable butter at refrigeration temperature which is sought by many modern consumers as an undesirable attribute. Therefore, new fields of applications of milkfat remain constrained due to its limited functionality (pourability and spreadability). The fractionation of milkfat by physical processes, into different fractions, has been effective only to a modest extent in improving its melting property. This known process, however, is tedious, time consuming and expensive. Another disadvantage associated with fractionation is the disruption of the normal aromatic balance of the milkfat. Therefore, the prior art has recognized the need for a process which produces a soft milkfat with a low melting point so that it is spreadable at refrigeration temperatures.

OBJECTS

It is an object of the present invention to provide an improved process for removal of free fatty acids (FFA) from animal fats, particularly milkfat. Further, it is an object of the present invention to provide a process where cholesterol is removed from the animal fat. Further still, it is an object of the present invention to provide a process for reducing the melting point of the animal fat. Further still, it is an object of the present invention to provide a process which is inexpensive to perform, which preserves flavors in the animal fat and which can be easily sealed up to large volumes using conventionally available equipment. These and other objects will become increasingly apparent by reference to the following discussion and the drawings.

SUMMARY OF THE INVENTION

The present invention relates to a process for reducing free fatty acids (FFA) present in an anhydrous liquid animal fat to form a processed animal fat which comprises the steps of reacting: (a) providing a reaction mixture of the free fatty acids in the liquid animal fat with a water solution of an alkali metal hydroxide selected from the group consisting of potassium hydroxide, sodium hydroxide and mixtures thereof at an elevated temperature with mixing so that the FFA present in the liquid animal fat forms a soluble fatty acid salt (SFAS); (b) reacting the SFAS with an alkaline earth metal salt so that the SFAS forms an insoluble fatty acid salt (IFAS) in the reaction mixture simultaneously with or after step (a); and (c) separating the IFAS from the reaction mixture to form the process animal fat.

In particular, the present invention relates to the use of β-cyclodextrin to remove cholesterol along with the free fatty acids. Further still, the present invention relates to the use of vegetable oils in blends with the processed animal fat to lower the melting point.

BRIEF DESCRIPTION OF THE DRAWINGS

FIG. 1 is a flow diagram showing a preferred process for the removal of FFA from anhydrous animal fat (AMF). The refining solution consists of distilled water, KOH and $CaCl_2$. The ratio of KOH:FFA is 1:1. The ratio of $CaCl_2$:FFA is 5:1.

FIG. 16 is a flow diagram showing a process for removing cholesterol FFA and decreasing the melting point of other anhydrous animal fat (AMF). The liquid formula consists of distilled water, corn oil, KOH and $CaCl_2$. The mole ratio of KOH:FFA is 1:1. The mole ratio of $CaCl_2$:FFA is 5:1. The water to corn oil weight ratio is 11.5:1.5.

DESCRIPTION OF PREFERRED EMBODIMENTS

Figure 2:
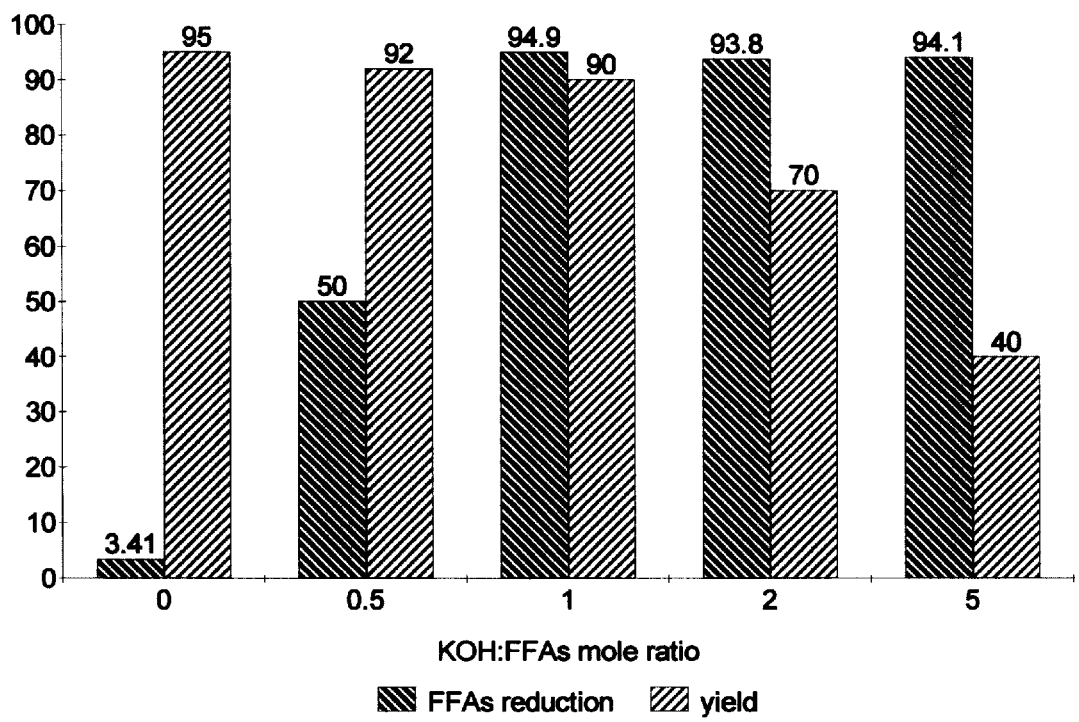
FIG. 2 is a graph showing the effect of KOH:FFA mole ratio on the reduction of FFA and the yield at $CaCl_2$:FFA mole ratio of 5, refining solution:AMF (w/w) of 1, mixing time 1 minute, mixing speed 1800 rpm, temperature 50° C., centrifugation of 1085×g for 10 minutes at room temperature.

The present invention provides a process which reduces FFA, and preferably, melting point and cholesterol in anhydrous milkfat using an aqueous liquid formula and β-cyclodextrin. The aqueous liquid formula consists of a mixture of an alkali metal hydroxide (Na, K), alkaline earth metal(Ca and Mg), and low melting point vegetable oils. The liquid formula is specifically designed to achieve the objectives in a single operation which gives the present invention many advantages over the prior art processes. The process titrates and selectively precipitates FFA in anhydrous milkfat using very dilute concentrations (0.023 to 0.058%) of alkali metal hydroxide (Na or K) and calcium or magnesium salts as fatty acceptors under very mild experimental conditions to protect milkfat flavor. Also, the process uses stoichiometric amounts of alkali metal hydroxide with respect to the free fatty acids present in milkfat to selectively remove the free fatty acids without precipitating or damaging the milkfat per se. The process uses alkaline earth metals to diminish the losses of milkfat and get a better yield and higher cholesterol reduction. The process reduces FFA based on relatively long reaction time and low temperature which are effective in preserving the milkfat flavor lactones. The process simultaneously reduces cholesterol, melting point and FFA in anhydrous milkfat using β-CD as a complexing agent for the cholesterol. The process significantly reduces cholesterol, FFA and melting point in animal fats, within a commercially feasible amount of time.

MATERIALS AND METHODS

Commercial grades of unsalted butter, beef tallow and lard were obtained from a local food store. The unsalted butter was converted into anhydrous milkfat (AMF) by melting at 55° C., centrifuging at 5000×g for 10 minutes at room temperature and filtering the top fat layer through Whatman No. 1 filter paper. The AMF was stored at −20° C. for future use.

Total cholesterol was extracted and quantified according to the AOAC Official Methods of Analysis, 16th ed. Association of Official Analytical Chemists, Washington, D.C. 994.10 (1995). The total cholesterol was quantified in underivatized form on a HEWLETT PACKARD 5890A gas chromatograph (GC) (Avondal, Pa.) equipped with a flame ionization detector and a fused silica capillary column (15 m×0.25 mm) (J & W Scientific, Folsom, Calif.) coated with 0.1 μm film of DB-1 (100% methyl polysiloxane).

FFA were determined according to the AOAC Official Methods of Analysis, 16th ed. Association of Official Analytical Chemists, Washington, D.C. 969.17 (1995).

Statistical analysis were performed using software packages to fit the second order models (SAS Institute, Inc. SAS User's Guide, Version 5, SAS Institute, Inc. Cary N.C. (1985)) and generate response surface plots. The model proposed for each response (Y) was:

$$Y = B_o + \Sigma B_i X_i + \Sigma B_{ii} X_i^2 + \Sigma B_{ij} X_i X_j$$

Where $B_o$, $B_i$, $B_{ii}$, $B_{ij}$ are constant and regression coefficients of the model, and $X_i$ the independent variables in coded values. The criteria for eliminating a variable from the full regression was based on $R^2$ values and the significance of f-test.

PROCESSES DEVELOPMENT
Process for Removal of FFA

A preferred process for removal of FFA from anhydrous milkfat (AMF) is outlined in FIG. 1. This process is based on a relatively long reaction time, a low concentration alkali solution and low temperature (40° to 50° C.). This is in contrast of the prior art process (used for cottonseed, corn, peanut, soybean and palm oil) which uses concentrated alkali solution (12 to 28° Be'), high temperatures (75–95°), and short reaction time (0.2 to 30 seconds). The rational for each step is described below. The refining solution in the process herein is a key control factor for a successful refining. The refining solution consists of an aqueous mixture of alkali metal hydroxide (Na or K) and Ca or Mg chloride.

EXAMPLE 1

When the diluted alkali metal hydroxide solution (KOH:FFA mole ratio of 1) reacts with FFA(1) or their esters (2), the result is the following reactions:

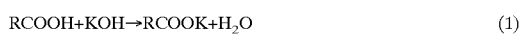

The amount of KOH is function of the FFA in AMF. A KOH:FFA mole ratio of 1 is enough to neutralize all the FFA present in the medium under the experimental conditions described in FIG. 1. An excess of alkali solution is very detrimental to the yield due to the losses of neutral fat by saponification. An excess of alkali solution is very detrimental to the flavor because the excess (OH⁻) hydrolyses the lactones to their corresponding hydroxy acids according to the following two reactions.

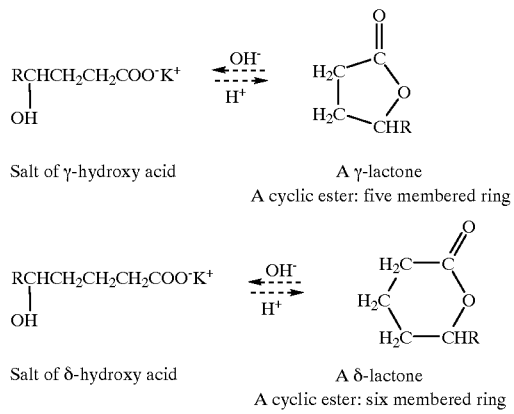

The effect of KOH:FFA mole ratio on the reduction of FFA and the yield is shown in FIG. 2.

COMPARATIVE EXAMPLE 2

10 (g) anhydrous milkfat containing 0.293% FFA were mixed with 10 mL dH$_2$O containing 0.763% CaCl$_2$ as described in the process outlined in FIG. 1. The pH of the CaCl$_2$ solution was adjusted to the alkaline side, pH 7.5 to 8.5 with potassium hydroxide. The free fatty acid reduction obtained at the alkaline pH tested was less than 20% thus showing that the potassium hydroxide cannot be added after the CaCl$_2$.

COMPARATIVE EXAMPLE 3

10 (g) anhydrous milkfat containing 0.293% FFA were mixed with 10 mL Tris-Hcl buffer containing 0.763% CaCl$_2$ as described in the process outlined in FIG. 1. The pH of the buffer varied from 7.5 to 8.5. The free fatty acid reduction obtained at the alkaline pH tested was less than 35%. The results were similar to Example 2.

EXAMPLE 4

Figure 3:
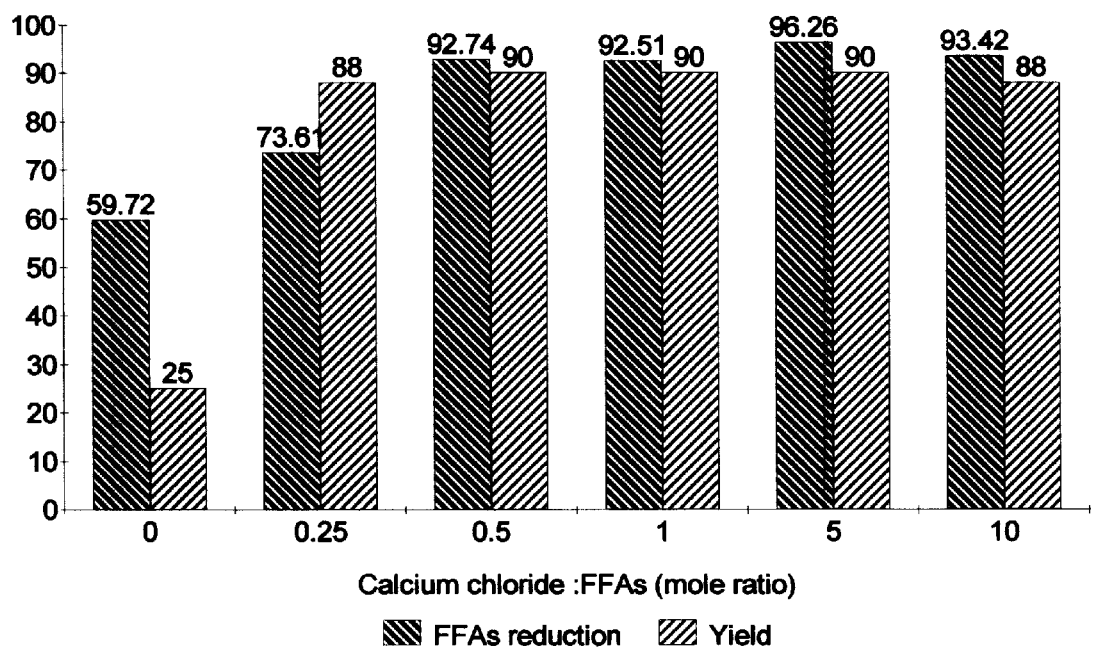
FIG. 3 is a graph showing the effect of $CaCl_2$:FFA mole ratio on the FFA reduction and yield, at KOH:FFA mole ratio of 1, refining solution:AMF (w/w) of 1, mixing time 1 minute, temperature 50° C., centrifugation at 1085×g for 10 minutes at room temperature.

The effect of CaCl$_2$:FFA mole ratio on the FFA reduction and the yield is shown in FIG. 3. Ca or Mg chloride were used as carboxylate acceptors. Their addition to the refining solution was necessary due to their ability to: (1) react with the carboxylates to form insoluble salts (similar to limestones) and therefore, their separation from the medium by centrifugation is very efficient; (2) react with the soluble K or Na soaps to form insoluble soaps and minimize the losses of neutral fat by emulsification and therefore, better yield; (3) synergistically increase the reduction of FFA in conjunction with KOH; (4) saturate the medium with cations and thus improve the FFA reduction by prohibiting the occurrence of the following reaction:

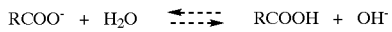

The excess of cations needs to be provided by the CaCl$_2$ or MgCl$_2$ and not by the caustic solution due to the detrimental effect of the excess hydroxyl group on the yield and the flavor.

EXAMPLE 5

Figure 4:
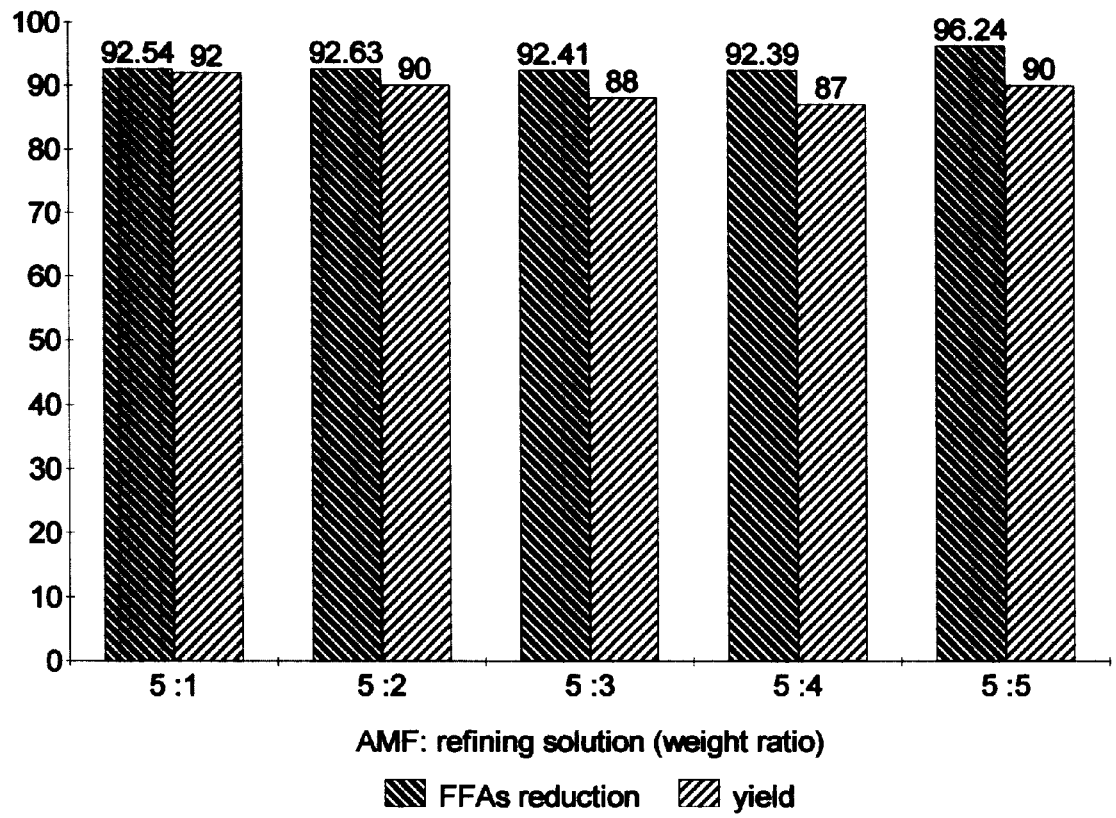
FIG. 4 is a graph showing the effect of the AMF:refining solution weight ratio on the FFA reduction and the yield at KOH:FFA mole ratio of 1, $CaCl_2$:FFA mole ratio of 5, mixing time 1 minute, temperature 50° C., mixing speed 1800 rpm, centrifugation of 1085×g for 10 minutes at room temperature.

The weight ratio of the refining solution to the AMF is important to the yield due to the losses by emulsification. However, under the experimental conditions described in FIG. 1, there was no significant losses in yield at different refining solution to AMF weight ratio as shown in FIG. 4.

EXAMPLE 6

Figure 5:
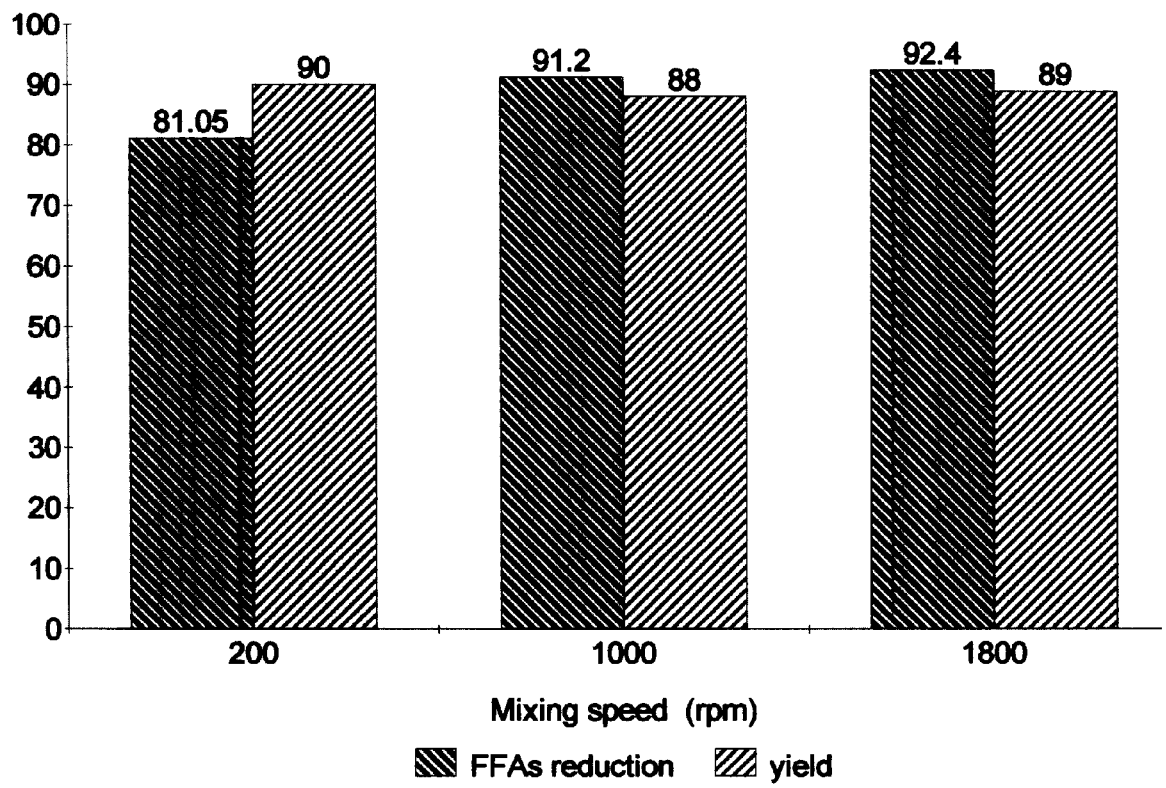
FIG. 5 is a graph showing the effect of mixing speed on the reduction of FFA and the yield at a refining solution:AMF weight ratio of 1, mixing time 10 minutes, temperature 50° C., FFA:KOH mole ratio of 1, $CaCl_2$:FFA mole ratio of 5, centrifugation at 1085×g for 10 minutes at room temperature.

The effect of the mixing speed on the reduction of the FFA and yield is shown in FIG. 5. After the refining solution has been added to the AMF, it should be completely mixed to assure a complete contact between the refining solution solutes and the FFA. The mixer used in this process was LIGHTNIN LAB MASTER, model L1U03 and an impeller type A100 (dia 1").

EXAMPLE 7

Figure 6:
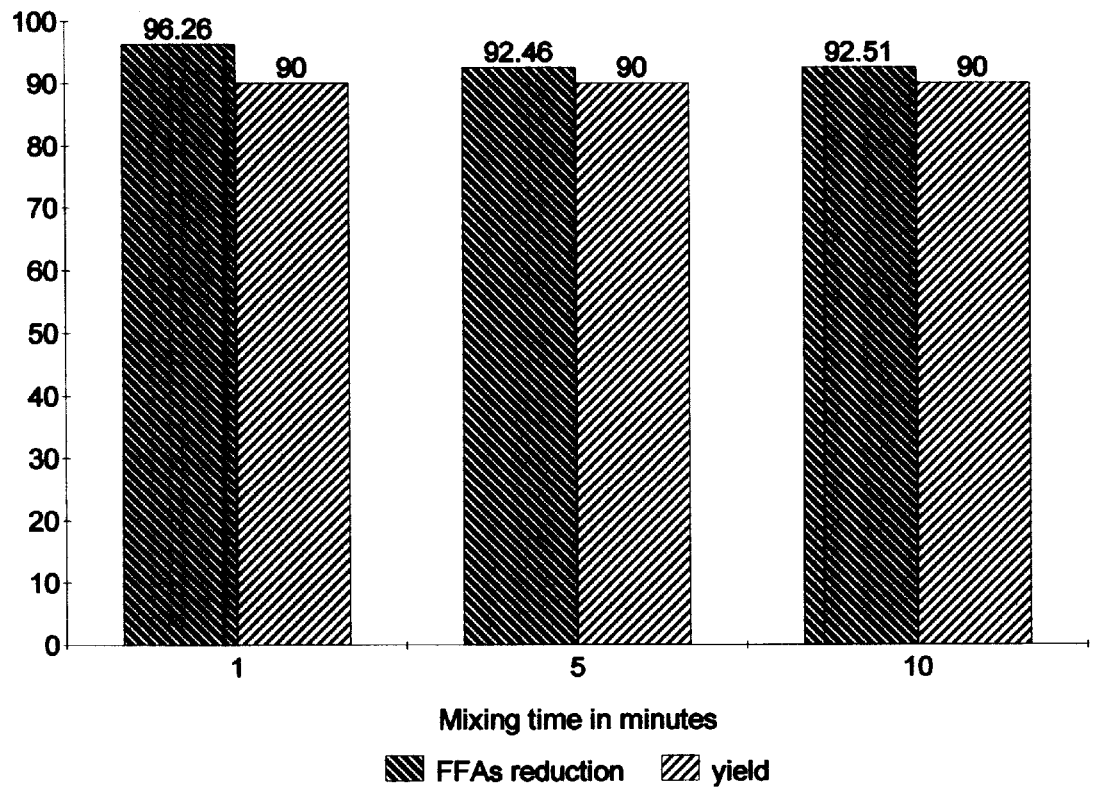
FIG. 6 is a graph showing the effect of mixing time on the FFA reduction and the yield at FFA:KOH mole ratio of 1, $CaCl_2$:FFA mole ratio of 5, refining solution:AMF weight ratio of 1, mixing speed 1800 rpm, temperature 50° C., centrifugation 8700×g for 10 minutes at room temperature.

As shown in FIG. 6, all the hydroxyl groups (OH$^-$) were consumed and neutralized by the FFA. The mixing time and temperature are very important to the yield. A long mixing time at a high temperature in the presence of high caustic concentration increases the saponification losses because any excess caustic is used in saponification of the neutral oil. The prior art process for oils used high caustic concentration, high temperature, and very short mixing time to prevent the losses by saponification. However, in this invention the use of a very dilute caustic (FFA:KOH mole ratio of 1), a temperature low enough to completely melt the AMF to create a fine emulsion with the refining solution, the wide range of mixing time (1 to 10 minutes) tested, did not affect the yield.

EXAMPLE 8

Figure 7:
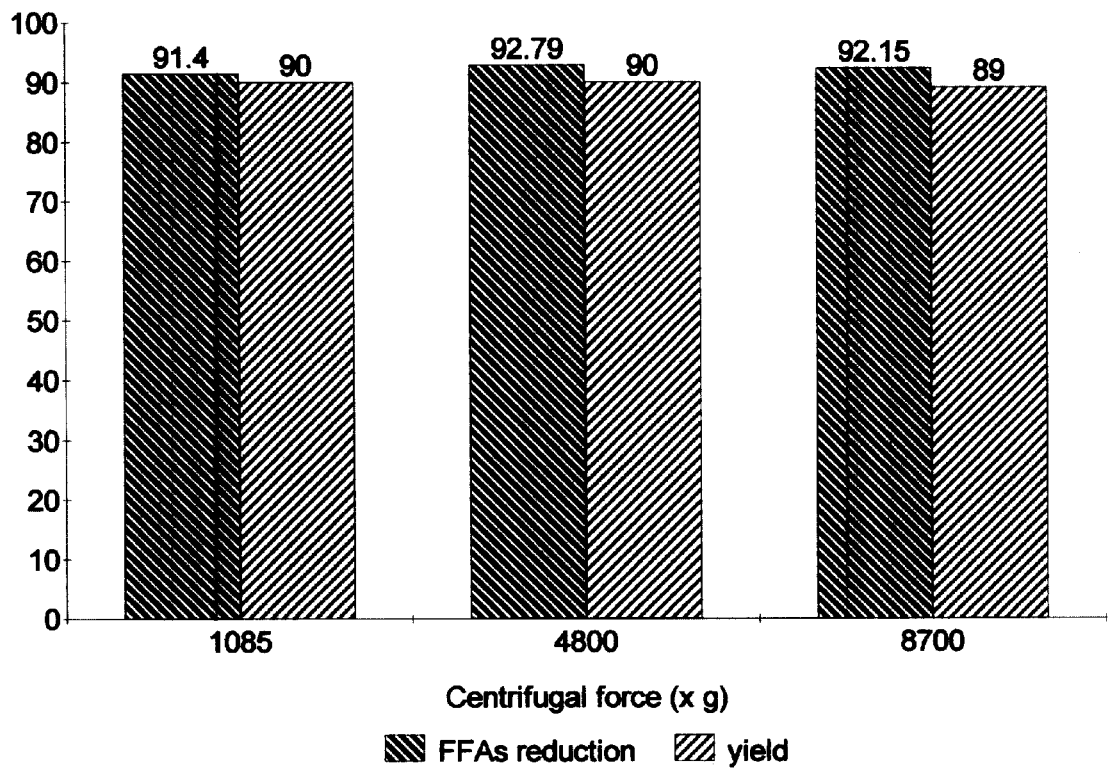
FIG. 7 is a graph showing the effect of the centrifugal force on the FFA reduction and the yield at FFA:KOH mole ratio of 1, $CaCl_2$:FFA mole ratio of 5, refining solution:AMF weight ratio of 1, mixing speed 1800 rpm, temperature 50° C., mixing time 10 minutes, centrifugation for 10 minutes at room temperature.

The range of centrifugal forces initially tested is shown in FIG. 7. The resultant soaps were separated from the medium by centrifugation. The mixture is preferably immediately centrifuged to avoid crystallization of AMF and therefore, bad soap separation. Centrifugation was fast and efficient.

EXAMPLE 9

10 (g) beef tallow containing 2.07% FFA were mixed with 10 mL refining solution (0.412% KOH and 5.409% CaCl$_2$) at 1800 rpm until the temperature reached 70° C. using LIGHTNIN LAB MASTER (SI) Mixer Model L1U03 and an impeller type A100 (dia 1"). As soon as the temperature reached 70° C., the mixer timer was set to 1 minute using the same mixing rate (1800 rpm). The resultant soaps were immediately centrifuged at 8700×g for 10 minutes at room temperature. The FFA reduced beef tallow was recovered in the upper supernatant phase. The FFA content of the refined tallow was 0.08%. The FFA reduction achieved was 96.01%.

EXAMPLE 10

10 (g) lard containing 0.122% FFA were mixed with 10 mL refining solution (0.024% KOH and 0.326% CaCl$_2$) at 1800 rpm until the temperature reached 50° C. using LIGHTNIN LAB MASTER (SI) Mixer Model L1U03 and an impeller type A100 (dia 1"). As soon as the temperature reached 50° C., the mixer timer was set to 1 minute using the same mixing rate (1800 rpm). The resultant soaps were immediately centrifuged at 8700×g for 10 minutes at room temperature. The FFA reduced lard was recovered in the upper supernatant phase. The FFA content of the refined lard was 0.02%. The FFA reduction achieved was 83.60%.

The process for reducing FFA in animal fats is based on the use of an alkali metal hydroxide as a neutralizing agent and Ca or Mg salts as fatty acceptors. The concept of this process is to use a dilute refining solution, low temperature and relatively long reaction times. The process has a number of attributes which results in considerable practical advantages over the prior art processes used for oil refining. The process is efficient and reduced the FFA in AMF to 0.02% in a single stop without the need for deodorization, in contrast to the prior art processes. The mild experimental conditions used in this process do not damage the fine flavor components of AMF, the lactones.

Process for Removal of FFA and Cholesterol

Figure 8:
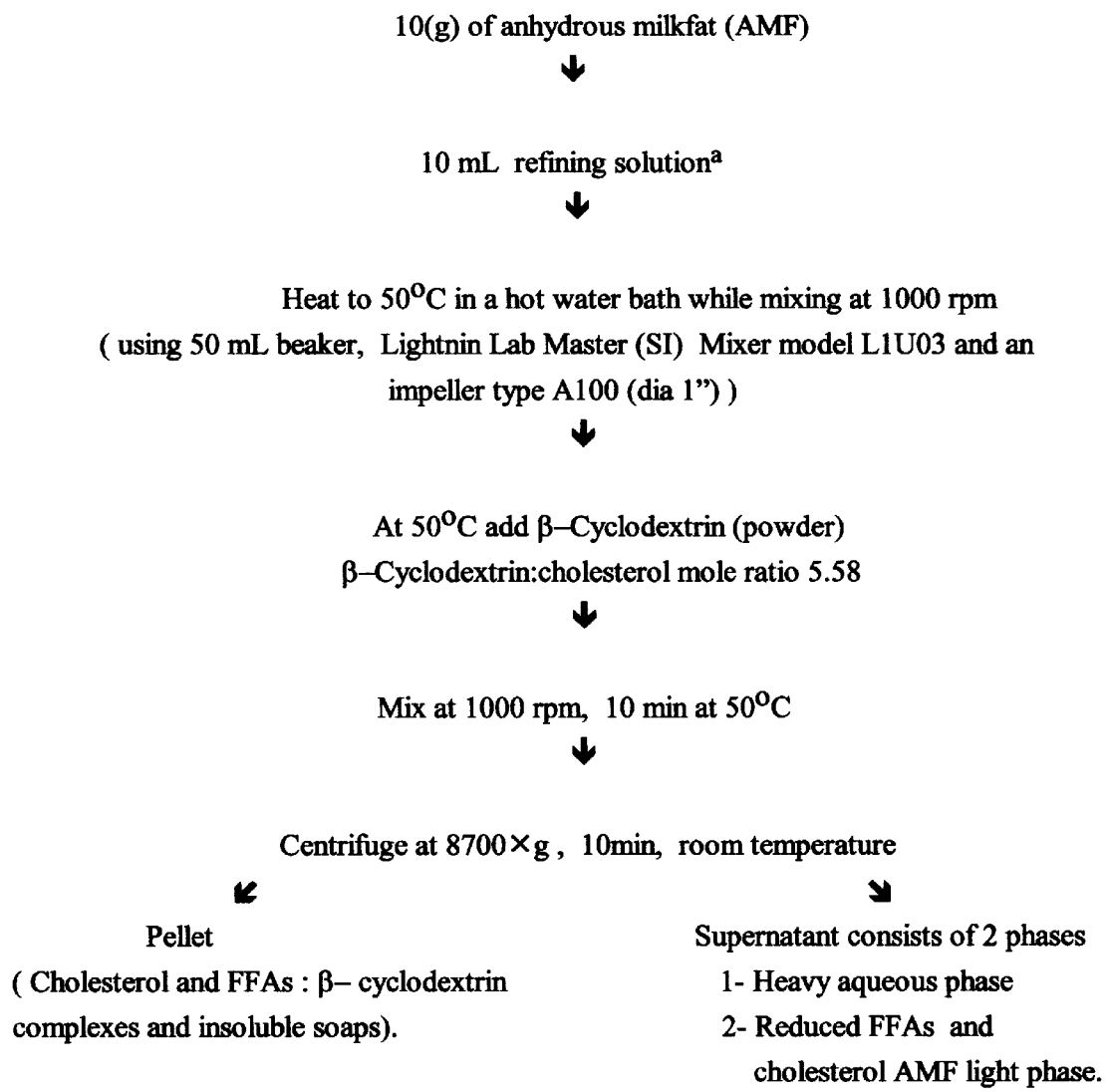
FIG. 8 is a flow diagram showing a preferred process for refining FFA and AMF. The refining solution consists of distilled water, KOH and $CaCl_2$. The ratio of KOH:FFA is 1:1. The ratio of $CaCl_2$:FFA is 5:1.

The process developed to reduce cholesterol and FFA in AMF is outlined in FIG. 8.

EXAMPLE 11

10 (g) AMF containing 0.395% cholesterol and 0.293% FFA were mixed with 10 mL refining solution (0.0583% KOH and 0.763% CaCl$_2$) at 1000 rpm until the temperature reached 50° C. At 50° C., 650 mg β-cyclodextrin (β-cyclodextrin:cholesterol mole ratio 5.58) were added to the mixture while mixing at the same rate for 10 more minutes. The resultant soaps and β-cyclodextrin:cholesterol complexes were immediately centrifuged at 8700×g for 10 minutes at room temperature. The reduced cholesterol and FFA in AMF were recovered in the upper supernatant phase. The cholesterol and FFA reduction achieved was 54 and 92%, respectively.

COMPARATIVE EXAMPLE 12

10 (g) AMF containing 0.395% cholesterol and 0.293% FFA were mixed with 10 mL distilled water at 1000 rpm until the temperature reached 50° C. At 50° C., 650 mg β-cyclodextrin (β-cyclodextrin:cholesterol mole ratio 5.58) were added to the mixture while mixing at the same rate for 10 more minutes. The resultant β-cyclodextrin:cholesterol and β-cyclodextrin:FFA complexes were immediately centrifuged at 8700×g for 10 minutes at room temperature. The reduced cholesterol and FFA in AMF were recovered in the upper supernatant phase. The cholesterol and FFA reduction achieved was 54 and 49.65%, respectively. This experiment shows the importance of the refining solution in improving the reduction of FFA in AMF, since the reduction was increased by 42.35%. Moreover, the refining solution did not affect the formation of complexes between cholesterol and β-cyclodextrin, since the cholesterol reduction remained unchanged.

EXAMPLE 13

When many factors and interactions affect desired responses, response surface methodology (RSM) is an effective tool for optimizing the process (Hunter, 1959). Thus, the optimization of the combined effects of the independent variables (KOH:FFA mole ratio, CaCl$_2$:FFA mole ratio, mixing time, β-cyclodextrin:cholesterol mole ratio, and mixing rate) on cholesterol and FFA reduction was accomplished using response surface methodology. Two responses were measured: cholesterol reduction % ($Y_1$) was defined as the ratio of the total amount of cholesterol in the sample to the total amount of cholesterol in the control multiplied by 100; FFA reduction % ($Y_2$) was defined at the ratio of the total amount of FFA in the sample to the total amount of FFA in the control multiplied by 100. Based on preliminary experiments, the five independent variables, shown in Table 1, were KOH:FFA mole ratio, $CaCl_2$:FFA mole ratio, mixing time, β-cyclodextrin:cholesterol mole ratio, mixing rate. The other important independent variables were held fixed: temperature and centrifugation (8700×g, 10 min, room temperature). The experimental design adopted was a 5 factor, 5 level central composite (John L. Gill, Design and Analysis of Experiments in the Animal and Medical Science. Volume (2), Chapter 9, Michigan State University (1993)). The coded values of the independent variables were −2 (lowest level), −1.0 (medium level), 1.0 and 2 (highest level). For each independent variable studied, the central value (0) was chosen according to the preliminary study as described in FIG. 8. The complete design shown in Table 2 consisted of 32 experimental points which included six (6) replications of the center (0, 0, 0, 0, 0).

TABLE 1

Variables and their levels for central composite design used in the process optimization

| Variable | Symbol | Coded-variable levels | | | | |
|---|---|---|---|---|---|---|
| | | −2 | −1 | 0 | +1 | +2 |
| KOH:FFA (mole ratio) | X1 | 0 | 0.5 | 1 | 1.5 | 2 |
| $CaCl_2$:FFA (mole ratio) | X2 | 0 | 2.5 | 5 | 7.5 | 10 |
| Mixing time (min) | X3 | 5 | 7.5 | 10 | 12.5 | 15 |
| β-cd:cholesterol | X4 | 4.72 | 5.15 | 5.58 | 6.01 | 6.4 |
| Mixing rate (rpm) | X5 | 200 | 600 | 1000 | 1400 | 1800 |

TABLE 2

Central composite design, arrangement and responses.

| | Variable levels[a] | | | | | Responses[b] | |
|---|---|---|---|---|---|---|---|
| Run | X1 | X2 | X3 | X4 | X5 | Y1 | Y2 |
| 1 | −1 | −1 | −1 | −1 | 1 | 61.78 | 69.53 |
| 2 | −1 | −1 | −1 | 1 | −1 | 28.58 | 58.07 |
| 3 | −1 | −1 | 1 | −1 | −1 | 46.46 | 68.06 |
| 4 | −1 | −1 | 1 | 1 | 1 | 77.3 | 75.3 |
| 5 | −1 | 1 | −1 | −1 | −1 | 38.53 | 69.16 |
| 6 | −1 | 1 | −1 | 1 | 1 | 63.66 | 79.12 |
| 7 | −1 | 1 | 1 | −1 | 1 | 68.22 | 77.6 |
| 8 | −1 | 1 | 1 | 1 | −1 | 40.5 | 70.79 |
| 9 | 1 | −1 | −1 | −1 | −1 | 20.41 | 92.42 |
| 10 | 1 | −1 | −1 | 1 | 1 | 65.41 | 92.28 |
| 11 | 1 | −1 | 1 | −1 | 1 | 65.98 | 92.38 |
| 12 | 1 | −1 | 1 | 1 | −1 | 42.84 | 92.21 |
| 13 | 1 | 1 | −1 | −1 | 1 | 54.28 | 96.16 |
| 14 | 1 | 1 | −1 | 1 | −1 | 38.21 | 90.36 |
| 15 | 1 | 1 | 1 | −1 | −1 | 32.28 | 92.35 |
| 16 | 1 | 1 | 1 | 1 | 1 | 74.23 | 92.48 |
| 17 | −2 | 0 | 0 | 0 | 0 | 59.98 | 31.35 |
| 18 | 2 | 0 | 0 | 0 | 0 | 53.52 | 92.33 |
| 19 | 0 | −2 | 0 | 0 | 0 | 38.03 | 91.92 |
| 20 | 0 | 2 | 0 | 0 | 0 | 53.32 | 92.38 |
| 21 | 0 | 0 | −2 | 0 | 0 | 37.49 | 92.24 |
| 22 | 0 | 0 | 2 | 0 | 0 | 63.64 | 92.63 |
| 23 | 0 | 0 | 0 | −2 | 0 | 46.85 | 92.64 |
| 24 | 0 | 0 | 0 | 2 | 0 | 55.7 | 92.45 |
| 25 | 0 | 0 | 0 | 0 | −2 | 11.91 | 81.6 |
| 26 | 0 | 0 | 0 | 0 | 2 | 73.7 | 92.61 |
| 27 | 0 | 0 | 0 | 0 | 0 | 52.27 | 92.45 |
| 28 | 0 | 0 | 0 | 0 | 0 | 56.27 | 92.22 |

TABLE 2-continued

Central composite design, arrangement and responses.

| | Variable levels[a] | | | | | Responses[b] | |
|---|---|---|---|---|---|---|---|
| Run | X1 | X2 | X3 | X4 | X5 | Y1 | Y2 |
| 29 | 0 | 0 | 0 | 0 | 0 | 53.02 | 92.53 |
| 30 | 0 | 0 | 0 | 0 | 0 | 54.48 | 92.1 |
| 31 | 0 | 0 | 0 | 0 | 0 | 54.94 | 92.45 |
| 32 | 0 | 0 | 0 | 0 | 0 | 54.02 | 91.93 |

[a]Coded variables
[b]Y1 is cholesterol reduction (%). Y2 is FFA reduction (%)

Analysis of variance (ANOVA) for the regression was performed to test the goodness of fit. Results of the analysis of variance of each of the responses with their corresponding coefficient of multiple determination ($R^2$) and coefficient of variation (CV) are shown in Table 3. From the analysis of the F values and $R^2$, only 4 independent variables (KOH:FFA mole ratio, mixing time, β-cyclodextrin:cholesterol mole ratio, and mixing rate) out of five appeared to influence the cholesterol reduction ($Y_1$). In fact, despite the exclusion of calcium chloride from the model, the $R^2$ remained high (0.95) and F-test significant to <0.001. The estimated regression coefficients for ($Y_1$) and the results of significance test on the coefficient for the 4 selected factors are indicated in Table 4. Also, from the analysis of the F values and $R^2$, only 3 independent variables (KOH:FFA mole ratio, $CaCl_2$:FFA mole ratio, and mixing rate) out of five appeared to influence the FFA reduction ($Y_2$). The exclusion of mixing time, β-cyclodextrin did not affect the model, since the $R^2$ remained high (0.96) and F-test significant to <0.001. The estimated regression coefficients for ($Y_2$) and the results of significance test on the coefficient for the 3 selected factors are indicated in Table 5. None of the models exhibited lacks of fit. Both models were considered adequate and usable with satisfactory $R^2$ values and significant F-test at <0.001. The predicted $Y_1$, $Y_2$, and the residual values using the model are reported in Tables 6 and 7.

Optimization Based on $Y_1$ (Percentage Cholesterol Reduction)

The model $Y_1$ is useful for indicating the direction to change variables to maximize cholesterol reduction. Judging from the significant regression coefficients (Table 4), the most important factors influencing cholesterol reduction are KOH:FFA mole ratio, mixing time, β-cyclodextrin:cholesterol mole ratio, and mixing rate. They showed significant first order, quadratic and two factor interaction terms.

TABLE 3

Parameter estimates and analysis of variance of the second order polynomial regression for 5 factors 2 responses (cholesterol (Y1) and FFA (Y2) reduction)

| | Y1 | | Y2 | |
|---|---|---|---|---|
| Source | Coefficient | prob > \|T\| | Coefficient | prob > \|T\| |
| Intercept | −18.66 | 0.91 | 29.09 | 0.87 |
| X1 | −139.81 | <0.01 | 160.62 | <0.01 |
| X2 | 12.67 | 0.07 | −3.75 | 0.06 |
| X3 | 10.3 | 0.14 | −4.98 | 0.5 |
| X4 | 9.97 | 0.85 | −13.76 | 0.82 |
| X5 | −0.01 | 0.68 | 0.06 | 0.16 |
| X1*X1 | 3.8 | 0.26 | −30.68 | <0.01 |

TABLE 3-continued

Parameter estimates and analysis of variance of the second order polynomial regression for 5 factors 2 responses (cholesterol (Y1) and FFA (Y2) reduction)

| | | | | |
|---|---|---|---|---|
| X2*X2 | −0.29 | 0.04 | −0.01 | 0.92 |
| X3*X3 | −0.09 | 0.48 | <−0.01 | 0.98 |
| X4*X4 | −2.25 | 0.63 | 0.14 | 0.97 |
| X5*X5 | <−0.01 | 0.01 | <−0.01 | 0.16 |
| X1*X2 | 1.38 | 0.14 | −2.26 | 0.04 |
| X1*X3 | 0.85 | 0.35 | −1.96 | 0.07 |
| X1*X4 | 21.15 | <0.01 | −7.71 | 0.2 |
| X1*X5 | <−0.01 | 0.55 | <−0.01 | 0.69 |
| X2*X3 | −0.55 | <0.01 | 0.04 | 0.82 |
| X2*X4 | −0.94 | 0.37 | 1.37 | 0.25 |
| X2*X5 | <0.01 | 0.94 | <0.01 | 0.38 |
| X3*X4 | −1.1 | 0.3 | 1.71 | 0.16 |
| X3*X5 | <0.01 | 0.19 | <−0.01 | 0.1 |
| X4*X5 | 0.01 | 0.05 | <−0.01 | 0.7 |
| | | | | |
| $R^2$ | | 0.97 | | 0.95 |
| F-ratio | | 20.07 | | 11.49 |
| prob F | | <0.05 | | <0.05 |
| CV (%) | | 8.77 | | 5.76 |

$$Y = B_o + \sum_{I=1}^{5} B_i X_i + \sum_{I=1}^{5} B_{ii} X_i X_i + \sum_{I=1}^{5} B_{ij} X_i X_j$$

TABLE 4

Parameter estimates and analysis of variance of the second order polynomial regression for 4 factors and one response (Cholesterol reduction ($Y_1$))

| Source | Coefficient | prob > |T| |
|---|---|---|
| Intercept | 51.91 | <0.01 |
| X1 | −3.99 | 0.05 |
| X3 | 10.76 | <0.01 |
| X4 | 4.97 | 0.01 |
| X5 | 30.44 | <0.01 |
| X1*X1 | 5.23 | 0.14 |
| X3*X3 | −0.94 | 0.78 |
| X4*X4 | −0.06 | 0.98 |
| X5*X5 | −8.7 | 0.02 |
| X1*X3 | −0.72 | 0.87 |
| X1*X4 | 12.86 | 0.01 |
| X1*X5 | 2.31 | 0.62 |
| X3*X4 | 0.26 | 0.95 |
| X3*X5 | 1.06 | 0.82 |
| X4*X5 | 4.36 | 0.35 |

$R^2 = 0.95$  F-ratio = 22.79  prob F <0.05  CV (%) = 9.1

$$Y = B_o + \sum_{I=1}^{4} B_i X_i + \sum_{I=1}^{4} B_{ii} X_i X_i + \sum_{I=1}^{4} B_{ij} X_i X_j$$

$Y1 = 51.91 − 3.99 X_1 + 10.76 X_3 + 4.97 X_4 + 30.44 X_5 − 8.7_5{}^2 + 12.86 X_1 X_4$

TABLE 5

Parameter estimates and analysis of variance of the second order polynomial regression for 3 factors and one response (FFA reduction ($Y_2$))

| Source | Coefficient | prob > |T| |
|---|---|---|
| Intercept | 92.11 | <0.01 |
| X1 | 24.58 | <0.01 |
| X2 | 2.39 | 0.07 |
| X5 | 5.28 | <0.01 |
| X1*X1 | −31.5 | <0.01 |
| X2*X2 | −1.19 | 0.6 |

TABLE 5-continued

Parameter estimates and analysis of variance of the second order polynomial regression for 3 factors and one response (FFA reduction ($Y_2$))

| | | |
|---|---|---|
| X5*X5 | −6.24 | 0.01 |
| X1*X2 | −5.91 | 0.07 |
| X1*X5 | −7.37 | 0.02 |
| X2*X5 | 0.99 | 0.75 |

$R^2 = 0.96$;  F-ratio = 65.34  prob F <0.05  CV (%) = 3.70

$$Y = B_o + \sum_{I=1}^{3} B_i X_i + \sum_{I=1}^{3} B_{ii} X_i X_i + \sum_{I=1}^{3} B_{ij} X_i X_j$$

$Y_2 = 92.11 + 24.58 X_1 + 5.28 X_5 − 31.5 X_1{}^2 − 6.24 X_5{}^2 − 7.37 X_1 X_5$

TABLE 6

Cholesterol reduction in AMF and the residuals as predicted by the second order polynomial regression for 4 factors

| Run | X1 | X3 | X4 | X5 | Y1 (actual) | Y1 (estimated) | Residuals (act − est) |
|---|---|---|---|---|---|---|---|
| 1 | −1 | −1 | −1 | 1 | 61.78 | 61.31 | 0.46 |
| 2 | −1 | −1 | 1 | −1 | 28.58 | 30.82 | −2.24 |
| 3 | −1 | 1 | −1 | −1 | 46.46 | 45.15 | 1.3 |
| 4 | −1 | 1 | 1 | 1 | 77.3 | 73.71 | 3.58 |
| 5 | −1 | −1 | −1 | −1 | 38.53 | 34.68 | 3.84 |
| 6 | −1 | −1 | 1 | 1 | 63.66 | 61.92 | 1.73 |
| 7 | −1 | 1 | −1 | 1 | 68.22 | 72.84 | −4.62 |
| 8 | −1 | 1 | 1 | −1 | 40.5 | 41.55 | −1.05 |
| 9 | 1 | −1 | −1 | −1 | 20.41 | 23.61 | −3.2 |
| 10 | 1 | −1 | 1 | 1 | 65.41 | 66.33 | −0.92 |
| 11 | 1 | 1 | −1 | 1 | 65.98 | 63.36 | 2.61 |
| 12 | 1 | 1 | 1 | −1 | 42.84 | 42.92 | −0.08 |
| 13 | 1 | −1 | −1 | 1 | 54.28 | 52.55 | 1.72 |
| 14 | 1 | −1 | 1 | −1 | 38.21 | 32.92 | 5.28 |
| 15 | 1 | 1 | −1 | −1 | 32.28 | 33.35 | −1.07 |
| 16 | 1 | 1 | 1 | 1 | 74.23 | 77.4 | −3.17 |
| 17 | −2 | 0 | 0 | 0 | 59.98 | 60.96 | −0.98 |
| 18 | 2 | 0 | 0 | 0 | 53.52 | 53.57 | −0.05 |
| 19 | 0 | 0 | 0 | 0 | 38.03 | 52.03 | −14 |
| 20 | 0 | 0 | 0 | 0 | 53.32 | 52.03 | 1.28 |
| 21 | 0 | −2 | 0 | 0 | 37.49 | 40.31 | −2.82 |
| 22 | 0 | 2 | 0 | 0 | 63.64 | 61.85 | 1.78 |
| 23 | 0 | 0 | −2 | 0 | 46.85 | 46.87 | −0.02 |
| 24 | 0 | 0 | 2 | 0 | 55.7 | 56.81 | −1.11 |
| 25 | 0 | 0 | 0 | −2 | 11.91 | 12.77 | −0.86 |
| 26 | 0 | 0 | 0 | 2 | 73.7 | 73.87 | −0.17 |
| 27 | 0 | 0 | 0 | 0 | 52.27 | 52.03 | 0.23 |
| 28 | 0 | 0 | 0 | 0 | 56.27 | 52.03 | 4.23 |
| 29 | 0 | 0 | 0 | 0 | 53.02 | 52.03 | 0.98 |
| 30 | 0 | 0 | 0 | 0 | 54.48 | 52.03 | 2.44 |
| 31 | 0 | 0 | 0 | 0 | 54.94 | 52.03 | 2.9 |
| 32 | 0 | 0 | 0 | 0 | 54.02 | 52.03 | 1.98 |

TABLE 7

Reduction of the FFA and the residual as predicted by the second order polynomial regression for 3 factors

| Run | X1 | X2 | X5 | Y2 (actual) | Y2 (estimated) | Residuals (act − est) |
|---|---|---|---|---|---|---|
| 1 | −1 | −1 | −1 | 69.53 | 71.65 | −2.12 |
| 2 | −1 | −1 | −1 | 58.07 | 63.17 | −5.1 |
| 3 | −1 | −1 | −1 | 68.06 | 63.17 | 4.88 |
| 4 | −1 | −1 | 1 | 75.3 | 71.65 | 3.64 |
| 5 | −1 | 1 | −1 | 69.16 | 68.02 | 1.13 |
| 6 | −1 | 1 | 1 | 79.12 | 77.5 | 1.61 |
| 7 | −1 | 1 | 1 | 77.6 | 77.5 | 0.09 |
| 8 | −1 | 1 | −1 | 70.79 | 68.02 | 2.76 |
| 9 | 1 | −1 | −1 | 92.42 | 94.4 | −1.98 |
| 10 | 1 | −1 | 1 | 92.28 | 95.5 | −3.22 |
| 11 | 1 | −1 | 1 | 92.38 | 95.5 | −3.12 |
| 12 | 1 | −1 | −1 | 92.21 | 94.4 | −2.19 |

TABLE 7-continued

Reduction of the FFA and the residual as predicted by the second order polynomial regression for 3 factors

| Run | X1 | X2 | X5 | Y2 (actual) | Y2 (estimated) | Residuals (act - est) |
|---|---|---|---|---|---|---|
| 13 | 1 | 1 | 1 | 96.16 | 95.43 | 0.72 |
| 14 | 1 | 1 | −1 | 90.36 | 93.34 | −2.98 |
| 15 | 1 | 1 | −1 | 92.35 | 93.34 | −0.99 |
| 16 | 1 | 1 | 1 | 92.48 | 95.43 | −2.95 |
| 17 | −2 | 0 | 0 | 31.35 | 36.03 | −4.6 |
| 18 | 2 | 0 | 0 | 92.33 | 85.19 | 7.13 |
| 19 | 0 | −2 | 0 | 91.92 | 88.53 | 3.38 |
| 20 | 0 | 2 | 0 | 92.38 | 93.31 | −0.93 |
| 21 | 0 | 0 | 0 | 92.24 | 92.11 | 0.12 |
| 22 | 0 | 0 | 0 | 92.63 | 92.11 | 0.51 |
| 23 | 0 | 0 | 0 | 92.64 | 92.11 | 0.52 |
| 24 | 0 | 0 | 0 | 92.45 | 92.11 | 0.33 |
| 25 | 0 | 0 | −2 | 81.6 | 80.58 | 1.01 |
| 26 | 0 | 0 | 2 | 92.61 | 91.16 | 1.44 |
| 27 | 0 | 0 | 0 | 92.45 | 92.11 | 0.33 |
| 28 | 0 | 0 | 0 | 92.22 | 92.11 | 0.1 |
| 29 | 0 | 0 | 0 | 92.53 | 92.11 | 0.41 |
| 30 | 0 | 0 | 0 | 92.1 | 92.11 | −0.01 |
| 31 | 0 | 0 | 0 | 92.45 | 92.11 | 0.33 |
| 32 | 0 | 0 | 0 | 91.93 | 92.11 | −0.18 |

KOH:FFA Mole Ratio

Figure 9:
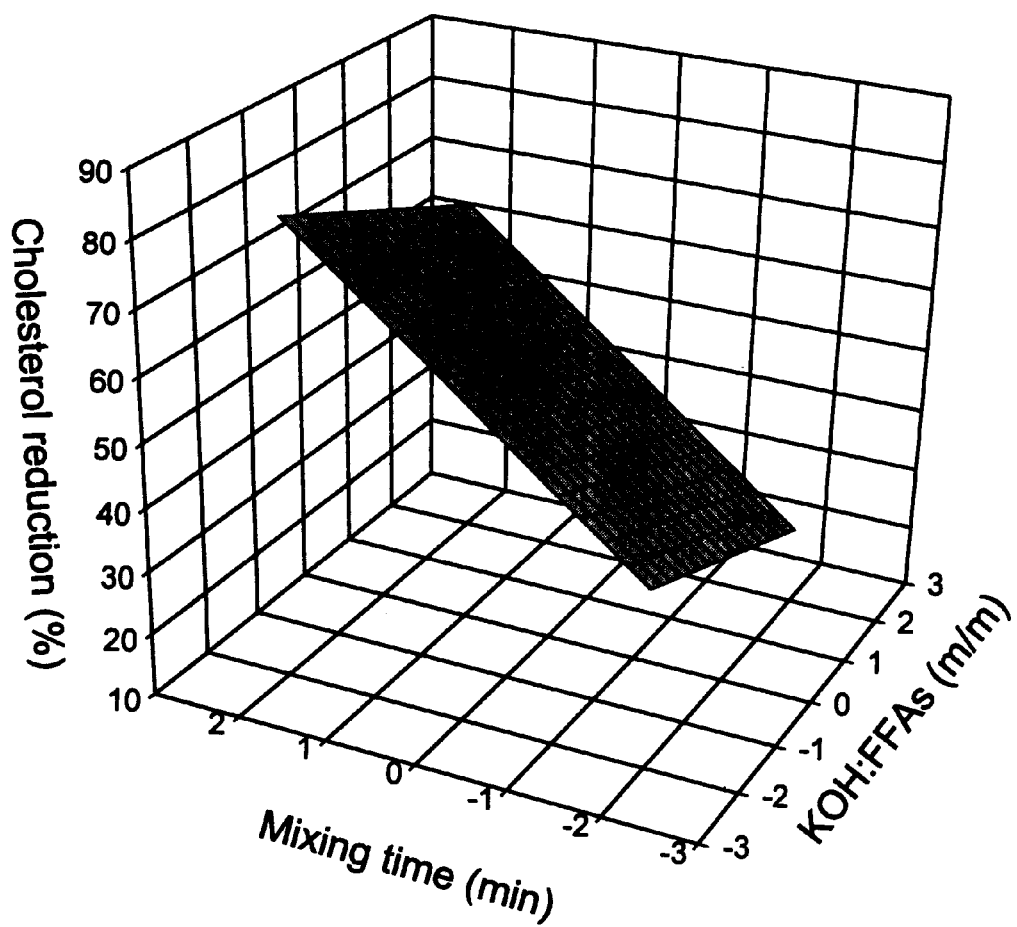
FIG. 9 is a graph showing response surface for percent cholesterol reduction ($Y_1$) of AMF at mixing rate 1000 rpm and β-cyclodextrin:cholesterol mole ratio 5.58.
Figure 10:
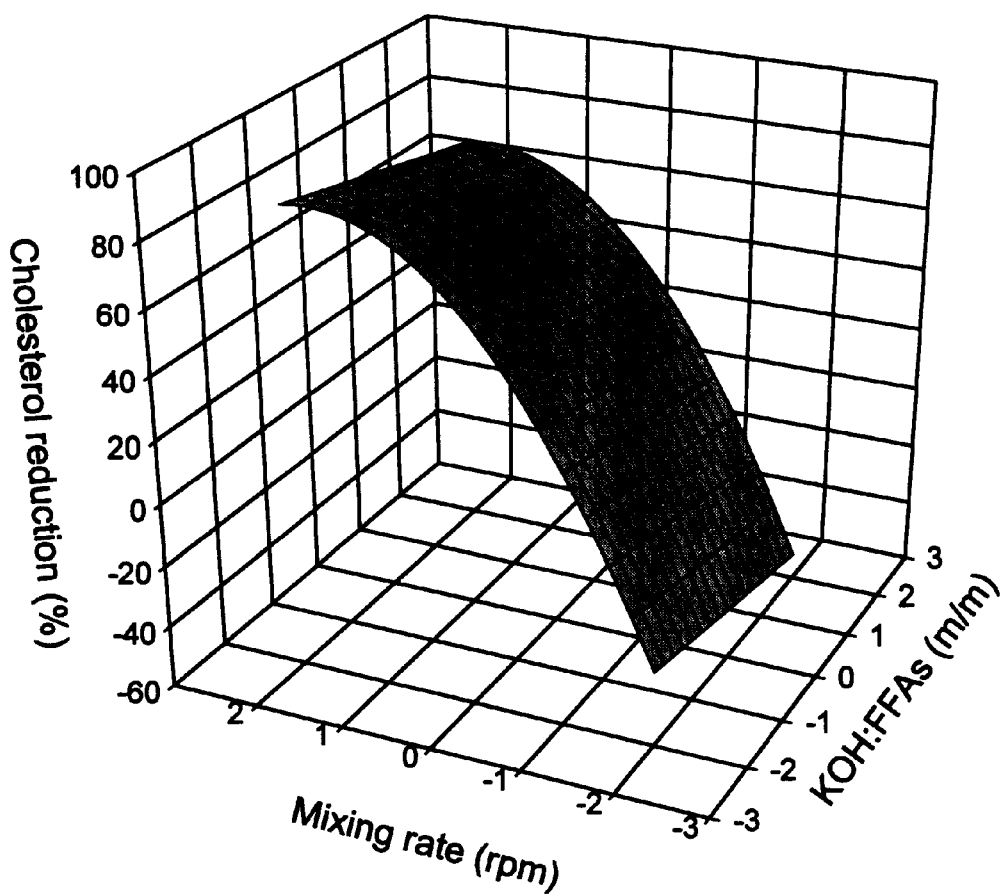
FIG. 10 is a graph showing response surface for percent cholesterol reduction ($Y_1$) of AMF at mixing time 10 minutes and β-cyclodextrin:cholesterol mole ratio 5.58.

KOH was used to neutralize the FFA and remove them from the medium. The range of KOH:FFA mole ratio examined is shown in Table 2. The negative slope: $b_1=-3.99$ (Table 4) indicated that cholesterol reduction decreased with increased KOH at any mixing time or rate (FIGS. 9 and 10). The negative effect of KOH on cholesterol reduction might be due to its ability to convert the FFA present in the medium to soap molecules. The soap molecules aggregate to form micelles, since their concentration in the medium (10.39 mM) surpasses the critical micelle concentration (cmc) which is reported to be 1.5 mM for sodium oleate (Small, D. M., Molecular Biology and Biotechnology, R. A. Meyers (ed), 503–511. VCH Publishers, Inc. USA (1995)). The negatively charged carboxylate groups stud the surface of the micelle and form hydrogen bonds with the hydroxyl groups on the external rim of the β-cyclodextrin molecules, and thus compete with cholesterol for the β-cyclodextrin molecules.

Figure 11:
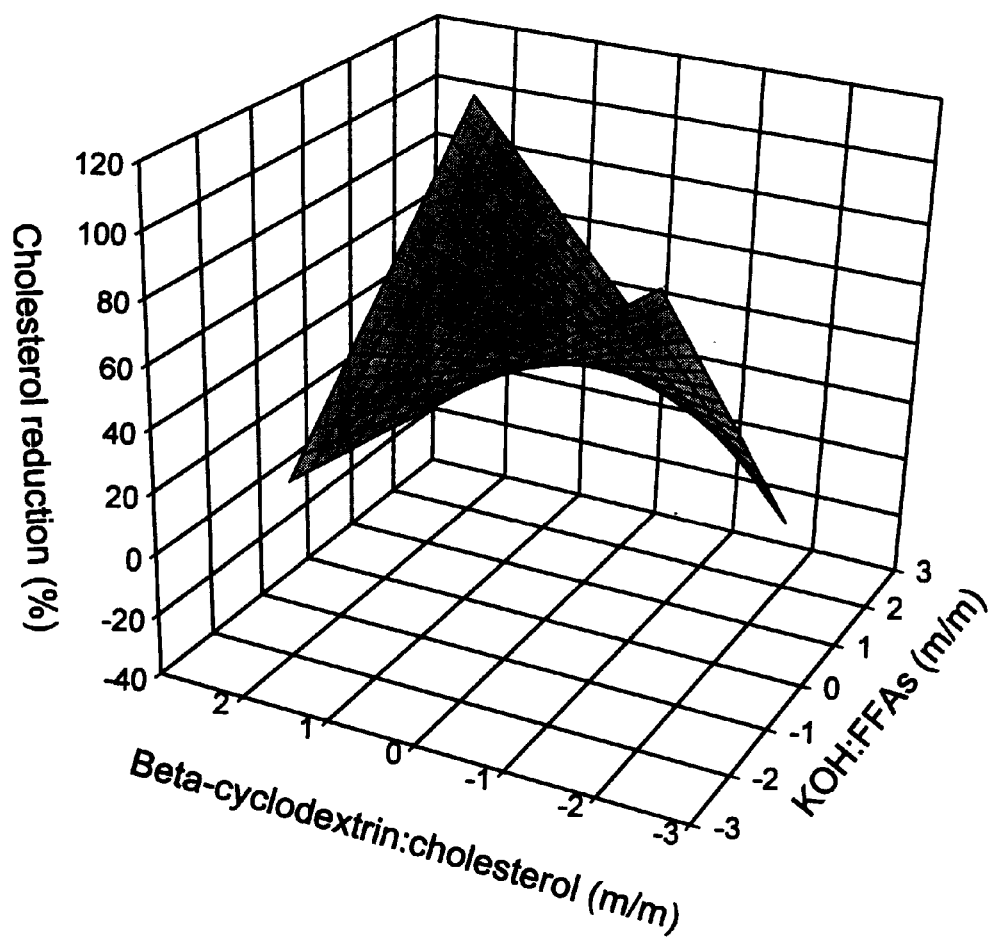
FIG. 11 is a graph showing response surface for percent cholesterol reduction ($Y_1$) of AMF at mixing time 10 minutes and mixing rate 1000 rpm.

The use of higher β-cyclodextrin:FFA mole ratio to counteract the negative effect of KOH as shown in FIG. 11, is not economically feasible. The shape of the response surface (FIG. 11) and the slope of the two factor interaction terms ($B_1B_4=12.86$) were characteristic of the strong interaction between these two variables. Calcium salts are carboxylate acceptors. The addition of calcium salts increased the cholesterol reduction by at least about 15% as shown in experiments # 18 and 19 (Table 2). Calcium salts react with the soluble potassium soaps to form insoluble calcium soaps which results in the destruction of the soap micelles, and thus, counteracting the detrimental effect of the soap micelles on cholesterol reduction. $CaCl_2$:FFA mole ratio used within the experimental domain had no significant effect on the model. The range of $CaCl_2$:FFA mole ratio tested is shown in Table 2.

Mixing Time

Figure 12:
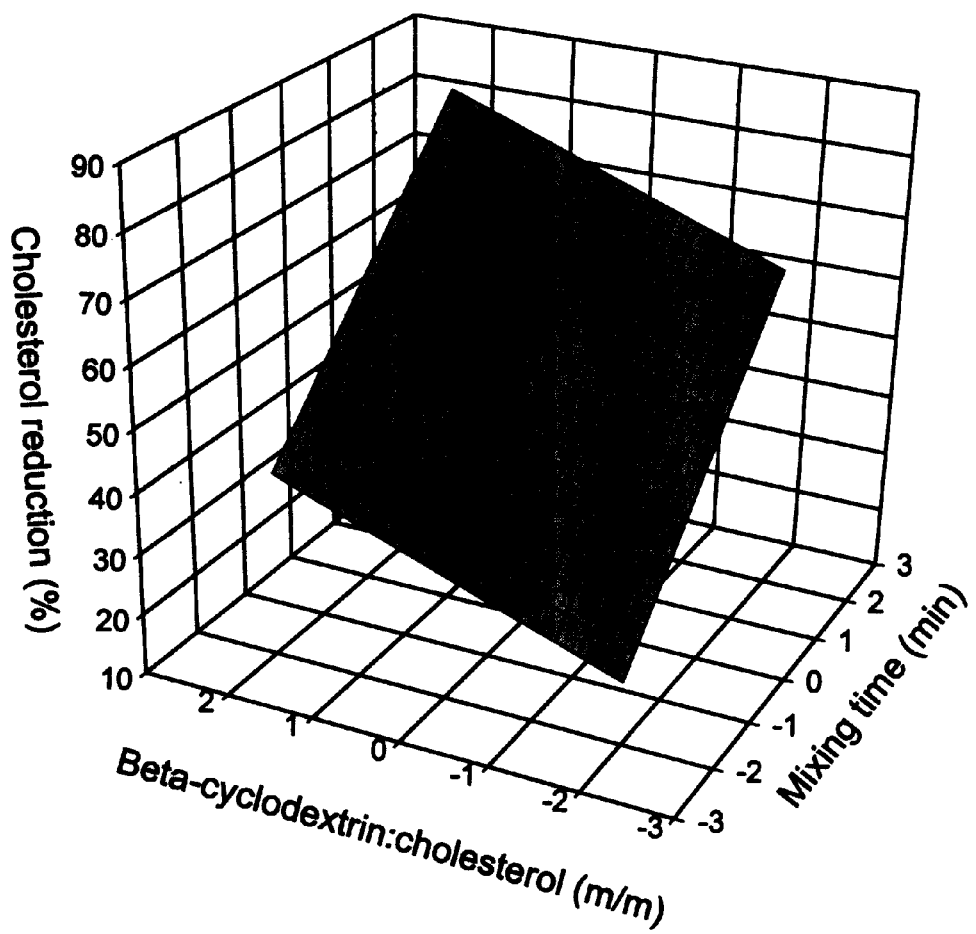
FIG. 12 is a graph showing response surface for percent cholesterol reduction ($Y_1$) of AMF at KOH:FFA mole ratio 1 and mixing rate 1000 rpm.
Figure 13:
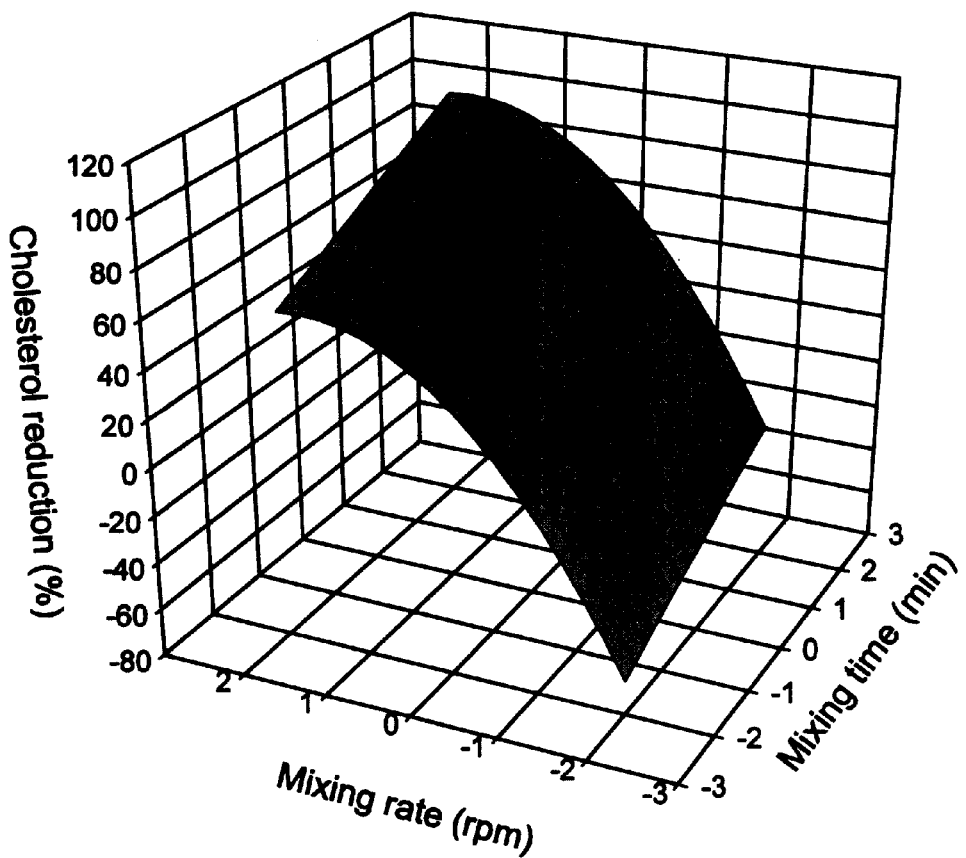
FIG. 13 is a graph showing response surface for percent cholesterol reduction ($Y_1$) of AMF at KOH:FFA mole ratio 1 and β-cyclodextrin:cholesterol mole ratio 5.58.

The cholesterol reduction $Y_1$ was strongly dependent on the mixing time. The positive slope $B_3=10.76$ indicated that cholesterol reduction increased with increased mixing time at any β-cyclodextrin:cholesterol mole ratio or any mixing rate (FIGS. 12 and 13). The range of mixing time examined is show in Table 2.

β-Cyclodextrin:Cholesterol Mole Ratio

Figure 14:
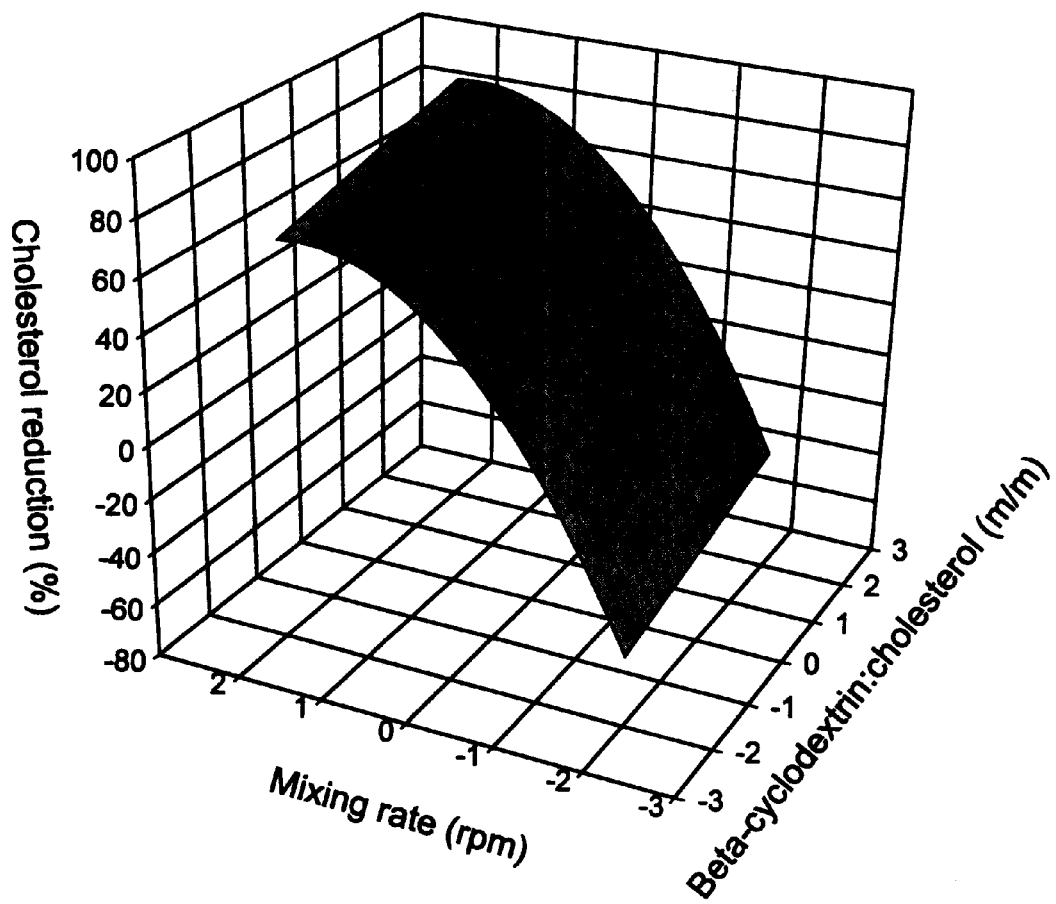
FIG. 14 is a graph showing response surface for cholesterol reduction ($Y_1$) of AMF at KOH:FFA mole ratio 1 and mixing time 10 minutes.

Theoretically one mole of β-cyclodextrin will complex one mole of compound (Szejtli, J., Inclusion Compound 3:331 (1984)). Some larger molecular weight compounds may complex with more then one cyclodextrin molecule (Szjetli 1984, IBID). The range of β-cyclodextrin:cholesterol mole ratio tested is shown in Table 2. The cholesterol reduction was strongly dependent on the b-cyclodextrin:cholesterol mole ratio. The positive slope $B_4=4.97$ indicated that cholesterol reduction increased with increased β-cyclodextrin:cholesterol mole ratio (FIG. 14).

Mixing Rate

The mixing rate is an important factor to assure contact between β-cyclodextrin and cholesterol, stabilize the oil-in-water emulsion. As soon as the temperature reached 50° C., β-cyclodextrin was added and mixed for 10 minutes using a LIGHTNIN LAB MASTER (MS) Mixer Model L1U03 and an impeller type A100 (dia 1"). The cholesterol reduction was strongly dependent on the mixing rate. The positive slope $B_5=30.44$ strongly indicated that cholesterol reduction increased with increased mixing rate at any β-cyclodextrin:cholesterol mole ratio. The shape of the response surface (FIG. 14) was characteristic of the strong interaction between β-cyclodextrin:cholesterol mole ratio and the mixing rate. The range of mixing rates tested is shown in Table 2.

Optimization Based on $Y_2$ (Percent FFA Reduction)

The model $Y_2$ is useful for indicating the direction to change variables to maximize FFA reduction. Judging from the significant regression coefficients (Table 5), the most important factors influencing FFA reduction are KOH:FFA mole ratio, $CaCl_2$:FFA mole ratio, and mixing rate. They showed significant first order, quadratic, and two factor interaction terms.

KOH:FFA Mole Ratio

When the very diluted alkali metal hydroxide solution of an exact measure strength (KOH:FFA mole ratio of 1) reacts with FFA, the result is the following reaction.

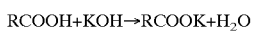

Figure 15:
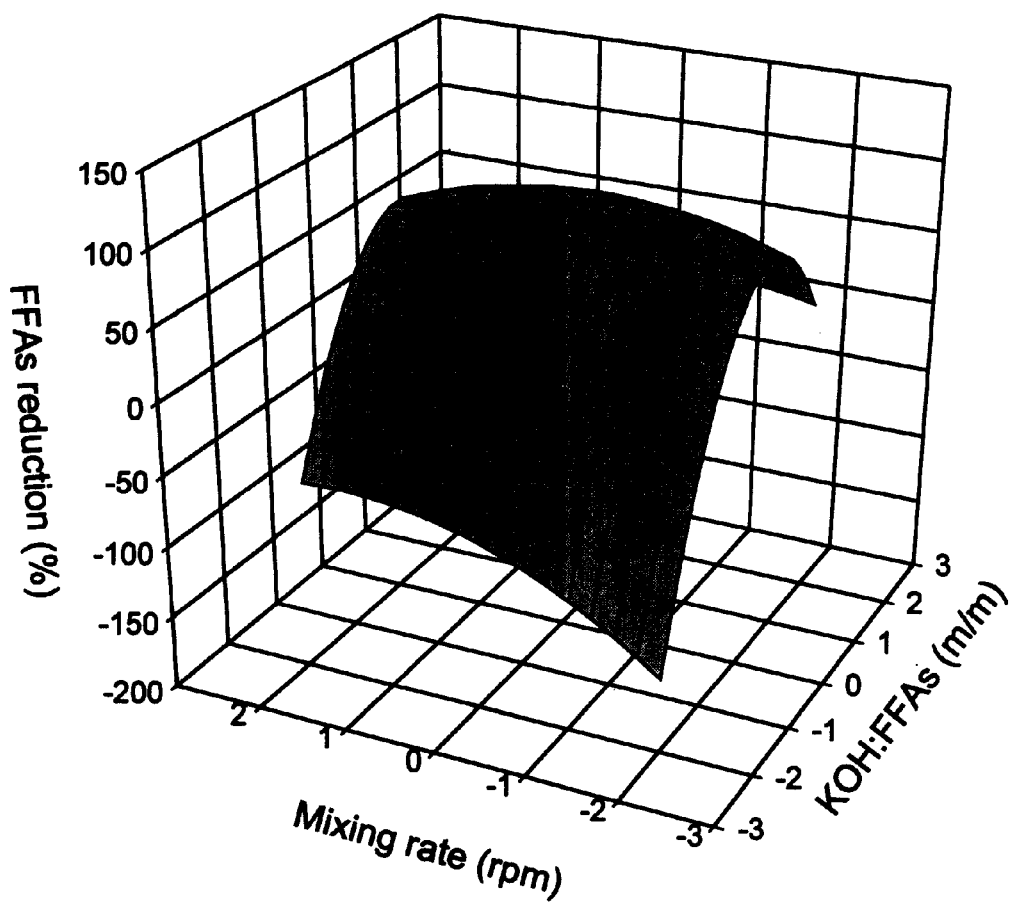
FIG. 15 is a graph showing response surface for percent FFA reduction ($Y_2$) of AMF.

The amount of KOH is function of the FFA in AMF. A KOH:FFA mole ratio of 1 is enough to neutralize all the FFA present in the medium under the proper experimental conditions described in FIG. 8. An excess of alkali solution is very detrimental to the yield due to the losses of neutral fat by saponification. An excess of alkali solution is very detrimental to the flavor because the excess ($OH^-$) hydrolyses the lactones to their corresponding hydroxy acids. The FFA reduction was strongly dependent on the KOH:FFA mole ratio. The positive slope $B_1=24.58$ (Table 5) indicated that FFA reduction increased with increased KOH:FFA mole ratio at any mixing rate (FIG. 15). The range of KOH:FFA mole ratio examined is shown in Table 2.

Calcium Chloride:FFA Mole Ratio

Calcium chloride was used as a carboxylate acceptor. Its addition to the refining solution is critical due to their ability to: (1) react with the carboxylate to form insoluble salts (similar to limestones) and therefore their separation from the medium by centrifugation is very efficient; (2) react with the soluble K or Na soaps to form insoluble soaps and minimize the losses of neutral fat by emulsification and therefore better yield; (3) to destroy the soap micelles and minimize the flocculation of the β-cyclodextrin on the electronegatively charged micelles surface, and therefore better cholesterol reduction (18 and 19 of Table 1); (4) synergistically increase the reduction of FFA in conjunction with KOH; and (5) saturate the medium with cations and thus improve the FFA reduction by prohibiting the occurrence of the following reaction.

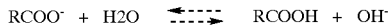

$$RCOO^- + H_2O \rightleftharpoons RCOOH + OH^-$$

The excess of cations are provided by the Ca salt and not by the caustic solution due to the detrimental effect of the excess hydroxyl group on the yield and the flavor. The range of $CaCl_2$:FFA mole ratio examined is shown in Table 2. The effect of calcium chloride on FFA reduction was predicted by the β-cyclodextrins present in the medium, since β-cyclodextrins themselves can reduce FFA.

Mixing Rate

The mixing rate is an important factor to assure contact between the solutes of the refining solution and FFA. The mixing rate used within the experimental domain had a slight effect on the FFA reduction (FIG. 15). The positive slope $B_5=5.28$ (Table 5) indicated that FFA reduction increased with increased mixing rate. The range of mixing rates tested is shown in Table 2.

EXAMPLE 14

The model for $Y_1$ showed that the higher the β-cyclodextrin:cholesterol mole ratio, mixing time, and mixing rate, the higher the cholesterol reduction. The joint effect of these 3 independent variables used in #4 and #26 OF Table 2, reduced AMF cholesterol by 77.30% and 73.70%, respectively. Further optimization of these treatments can improve the cholesterol reduction. The amount of β-cyclodextrin used in experiment #4 of Table 2 is higher than the amount used in experiment #26. Taking into account the cost-effectiveness of the process, the further optimization was performed on experiment #26 of Table 2. #26 was optimized with regard to mixing time, since increasing the amount of β-cyclodextrin is not economically feasible and the use of higher mixing rates can increase the viscosity of the medium which causes yield problems during centrifugation. Taking into consideration the two responses studied, it was found that the reduction of cholesterol can be further improved by increasing the mixing time. In fact, the theoretical mathematical model for cholesterol reduction showed that the cholesterol could be completely removed at about 30 to 35 minutes of mixing time.

The main objectives of the present invention are to reduce the cholesterol, free fatty acids, and melting point in animal fats in one single operation, to produce a healthy fat that is spreadable at refrigeration temperatures. These objectives can be accomplished by using the final optimized process outlined in FIG. 16.

EXAMPLE 15

10 (g) AMF containing 0.283% cholesterol and 0.3% FFA were mixed at 1400 rpm with 10, 13, 16, 22, 30 (g) "liquid formula" having a water to corn oil weight ratio of 10:0, 11.5:1.5, 13:3, 16:6 and 20:10, respectively, until the temperature reached 50° C. The "liquid formula" used for all the experiments consists of KOH, $CaCl_2$, $dH_2O$ and corn oil. The ratios of the different components are as follows: KOH:FFA mole ratio 1:1 (fixed ratio), FFA:$CaCl_2$ mole ratio 1:5 (fixed ratio) and variable weight ratios of $H_2O$:corn oil as described above. At 50° C., 650 mg β-cyclodextrin were added to the mixture while mixing at the same rate (1400 rpm) for 30 more minutes. The resultant soaps and β-cyclodextrin:cholesterol complexes were immediately centrifuged at 8700×g for 10 minutes at room temperature. The modified anhydrous milkfat is recovered in the upper supernatant phase. The cholesterol, FFA melting point reductions achieved are illustrated in Table 8.

EXAMPLE 16

10 (g) beef tallow containing 0.0796% cholesterol and 0.547% FFA were mixed with 10 (g) "liquid formula" (0.108% KOH, 1.42% $CaCl_2$, and water:corn oil weight ratio 10:0) at 1400 rpm until the temperature reached 50° C. At 50° C., 650 mg β-cyclodextrin were added to the mixture while mixing at the same rate for 30 more minutes. Then the mixture was heated to 55° C. to improve the separation of soaps and β-cyclodextrin:cholesterol complexes. The resultant soaps and β-cyclodextrin:cholesterol complexes were immediately centrifuged at 8700×g for 5 minutes at room temperature. The rotor of the centrifuge was heated to 50° C. in a hot water bath. The reduced cholesterol and FFA beef tallow was recovered in the upper supernatant phase. The cholesterol and FFA reduction achieved was 100% and 98.16%, respectively.

TABLE 8

Effect of water to corn oil weight ratio of the liquid formula on cholesterol, FFA, and melting point reduction in anhydrous milkfat.

| | Water:corn oil (w/w) | | | | |
|---|---|---|---|---|---|
| | 10:0 | 11.5:1.5 | 13:3 | 16:6 | 20:10 |
| Cholesterol % | 0.0118 | 0.0135 | 0.0208 | 0.0421 | 0.0628 |
| FFA % | 0.02 | 0.02 | 0.02 | 0.02 | 0.02 |
| Weily melting point ° C. | 35 | 33 | 30 | 27 | 25 |

EXAMPLE 17

10 (g) lard containing 0.071% cholesterol and 0.122% FFA were mixed with 10 (g) "liquid formula" (0.024% KOH and 0.326% $CaCl_2$ and water to corn oil weight ratio 10:0) at 1400 rpm until the temperature reached 50° C. At 50° C., 650 mg β-cyclodextrin were added to the mixture while mixing at the same rate for 30 more minutes. The resultant soaps and β-cyclodextrin:cholesterol complexes were immediately centrifuged at 8700×g for 10 minutes at room temperature. The reduced cholesterol and FFA lard was recovered in the upper supernatant phase. The cholesterol and FFA reduction achieved was 100% and 95.5%, respectively.

The process of the present invention reduces FFA, cholesterol and melting point in animal fat is based on the use of alkali metal hydroxide as a neutralizing agent, Calcium salt as carboxylate acceptors, β-cyclodextrin as a complexing agent, and a low melting point vegetable oil to produce cholesterol free anhydrous milkfat that is spreadable at refrigeration temperatures. The concept of this process is to use a dilute aqueous "liquid formula", low temperatures and relatively long reaction times. The process has a number of attributes which result in considerable practical advantages over the prior art processes used for reducing cholesterol and FFA in milkfat. The process is efficient since the cholesterol was completely removed in a single step, the cholesterol reduction obtained was at least about 20% higher than the prior art. The reduction of FFA observed was higher than 92.40%, which was more than 45% higher than the prior art processes. The process is cost effective and efficient since all our objectives were achieved in a single operation which gives this process many advantages over the prior art processes. The process could be done in a closed system to protect AMF from exposure to air to minimize oxidative deterioration. This process does not require expensive specialized capital equipment. It requires only heating and mixing followed by centrifugation.

The processed animal fat without the FFA or cholesterol can be homogenized in low fat or fat free milk to reconstitute a whole milk. This product can be used for making cheese or ice cream.

It is intended that the foregoing description be only illustrative of the present invention and the present invention be limited only by the hereinafter appended claims.

We claim:

1. A process for reducing free fatty acids (FFA) present in an anhydrous liquid animal fat to form a processed animal fat which comprises the steps of reacting:
   (a) providing a reaction mixture of the free fatty acids in the liquid animal fat with a water solution of an alkali metal hydroxide selected from the group consisting of potassium hydroxide, sodium hydroxide and mixtures thereof at an elevated temperature with mixing so that the FFA present in the liquid animal fat forms a soluble fatty acid salt (SFAS);
   (b) reacting the SFAS with an alkaline earth metal salt so that the SFAS forms an insoluble fatty acid salt (IFAS) in the reaction mixture simultaneously with or after step (a); and
   (c) separating the IFAS from the reaction mixture to form the processed animal fat.

2. The process of claim 1 wherein in addition the animal fat is mixed with β-cyclodextrin to remove cholesterol present in the animal fat.

3. The process of claim 1 wherein in addition the animal fat is mixed with β-cyclodextrin after steps (a) and (b) and prior to separating the IFAS.

4. The process of any one of claims 1, 2 or 3 wherein the base is potassium hydroxide.

5. The process of any one of claims 1, 2 or 3 wherein the alkaline earth metal salt is calcium chloride.

6. The process of any one of claims 1, 2 or 3 wherein the base is potassium hydroxide, the mole ratio of potassium hydroxide to FFA is between 0.5 to 5 to 1, the alkaline earth metal salt is calcium chloride and the mole ratio of $CaCl_2$ to FFA is between about 0.25 and 10 to 1.

7. The process of any one of claims 1, 2 or 3 wherein the temperature is between about 0°–55° C.

8. The process of any one of claims 1, 2 or 3 wherein the mole ratio of base to FFA is between about 0.5 and 5.

9. The process of any one of claims 1, 2 or 3 wherein the mixing in step (a) is for between 5 and 35 minutes.

10. The process of any one of claims 1, 2 or 3 wherein the IFAS are separated by centrifugation.

11. The process of any one of claims 1, 2 or 3 wherein a vegetable oil is provided in the reaction mixture as a liquid.

12. The process of any one of claims 1, 2 or 3 wherein a vegetable oil is provided in the reaction mixture as a liquid in a ratio to the water by weight of between about 0.15 to 1 and 1 to 2.

13. The process of any one of claims 1, 2 or 3 wherein the base is potassium hydroxide, the mole ratio of potassium hydroxide to FFA is between 0.5 to 5 to 1, the alkaline earth metal salt is calcium chloride, the mole ratio of $CaCl_2$ to FFA is between about 0.25 and 10 to 1, the temperature is between about 0°–55° C., the mole ratio of base to FFA is between about 0.5 and 5; wherein the mixing is for between 5 and 35 minutes the IFAS are separated by centrifugation.

14. The process of any one of claims 1, 2 or 3 wherein the base is potassium hydroxide, the mole ratio of potassium hydroxide to FFA is between 0.5 to 5 to 1, the alkaline earth metal salt is calcium chloride, the mole ratio of $CaCl_2$ to FFA is between about 0.25 and 10 to 1, the temperature is between about 0°–55° C., the mole ratio of base to FFA is between about 0.5 and 5, the mixing is for between 5 and 35 minutes, the IFAS are separated by centrifugation, and a vegetable oil is provided in the reaction mixture as a liquid.

15. The method of any one of claims 1, 2 or 3 wherein the mixing in step (a) is by a multi-bladed mixer at 200 to 1800 rpm.

16. The process of claim 2 wherein the mole ratio of cyclodextrin to cholesterol is between about 4.7 and 6.4 to 1.

17. The process of claim 1 wherein in addition the animal fat is mixed with a cyclodextrin to remove cholesterol present in the animal fat and wherein the IFAS and the cholesterol and cyclodextrin are separated by centrifugation.

18. The process of any one of claims 1, 2 or 3 wherein the base is potassium hydroxide, the mole ratio of potassium hydroxide to FFA is between 0.5 to 5 to 1, the alkaline earth metal salt is calcium chloride, the mole ratio of $CaCl_2$ to FFA is between about 0.25 and 10 to 1, the temperature is between about 0°–55° C., the mole ratio of base to FFA is between about 0.5 and 5, the mixing is for between 5 and 35 minutes, the IFAS are separated by centrifugation, and a vegetable oil is provided in the reaction mixture as a liquid and wherein β-cyclodextrin is also mixed with the animal fat to remove cholesterol simultaneously with the IFAS during the centrifugation, and the mole ratio of β-cyclodextrin to cholesterol is between 4.72 and 6.4 to 1.

19. The process of any one of claims 1, 2 or 3 wherein the base is potassium hydroxide, the mole ratio of potassium hydroxide to FFA is between 0.5 and 5 to 1, the alkaline earth metal salt is calcium chloride, the mole ratio of $CaCl_2$ to FFA is between about 0.25 and 10 to 1, the temperature is between about 0° and 55° C., the mole ratio of base to FFA is between about 0.5 and 5, the mixing is for between 5 and 35 minutes, the IFAS are separated by centrifugation, and a vegetable oil is provided in the reaction mixture as a liquid and wherein β-cyclodextrin is also mixed with the animal fat to remove cholesterol during the centrifugation and the mole ratio of β-cyclodextrin to cholesterol is between about 4.72 and 6.4 to 1.

20. The process of any one of claims 1, 2 or 3 wherein the processed animal fat is in addition homogenized in low fat or fat free milk to reconstitute whole milk.

* * * * *